B1

United States Patent
Brandenberg

(10) Patent No.: US 9,854,903 B1
(45) Date of Patent: Jan. 2, 2018

(54) TABLE WITH RETRACTABLE POWER CABLES

(71) Applicant: Carl Brock Brandenberg, Fort Worth, TX (US)

(72) Inventor: Carl Brock Brandenberg, Fort Worth, TX (US)

(*) Notice: Subject to any disclaimer, the term of this patent is extended or adjusted under 35 U.S.C. 154(b) by 0 days.

(21) Appl. No.: 15/274,908

(22) Filed: Sep. 23, 2016

Related U.S. Application Data

(60) Provisional application No. 62/222,403, filed on Sep. 23, 2015.

(51) Int. Cl.
| | | |
|---|---|---|
| *A47B 3/00* | (2006.01) | |
| *A47B 21/06* | (2006.01) | |
| *H02G 11/00* | (2006.01) | |
| *F16L 3/01* | (2006.01) | |

(52) U.S. Cl.
CPC ............... *A47B 21/06* (2013.01); *F16L 3/01* (2013.01); *H02G 11/006* (2013.01); *A47B 2021/066* (2013.01)

(58) Field of Classification Search
CPC .............. A47B 21/06; A47B 2021/062; A47B 2021/064; A47B 2021/066; A47B 2021/068; F16L 3/01; H02G 11/006
USPC ...................................................... 108/50.02
See application file for complete search history.

(56) References Cited

U.S. PATENT DOCUMENTS

| 4,792,881 | A | * | 12/1988 | Wilson | A47B 21/06 312/223.6 |
|---|---|---|---|---|---|
| 4,838,177 | A | * | 6/1989 | Vander Park | A47B 17/003 108/155 |
| 5,024,167 | A | * | 6/1991 | Hayward | A47B 17/003 108/50.02 |
| 5,429,431 | A | * | 7/1995 | Olson | A47B 21/06 108/23 |
| 6,725,784 | B2 | * | 4/2004 | Crinion | A47B 17/00 108/50.01 |
| 7,357,086 | B2 | * | 4/2008 | Petrick | A47B 21/00 108/50.02 |
| 2004/0149177 | A1 | * | 8/2004 | Gayhart | A47B 37/00 108/50.02 |
| 2005/0268823 | A1 | * | 12/2005 | Bakker | A47B 21/06 108/50.02 |
| 2009/0165680 | A1 | * | 7/2009 | Bakker | A47B 21/06 108/50.02 |
| 2009/0260547 | A1 | * | 10/2009 | Epstein | A47B 37/00 108/50.02 |
| 2009/0273260 | A1 | * | 11/2009 | Kemp | A47B 21/06 312/223.3 |
| 2009/0293773 | A1 | * | 12/2009 | Miller | A47B 21/00 108/28 |
| 2011/0197794 | A1 | * | 8/2011 | Nunes | B65H 75/36 108/50.02 |

(Continued)

*Primary Examiner* — Hanh V Tran
(74) *Attorney, Agent, or Firm* — James E. Walton

(57) ABSTRACT

A table for concealing one or more power adapters, each power adapter having a power cord, includes a frame, at least one table top supported by the frame, a volume at least partially concealed by the table top, at least one power outlet disposed within the volume for receiving the one or more power adapters, and at least one cord organizing member operably associated with one or more power cords, each cord organizing member being disposed at least partially within the volume for organizing the one or more power cords.

11 Claims, 39 Drawing Sheets

(56) References Cited

U.S. PATENT DOCUMENTS

| | | | |
|---|---|---|---|
| 2011/0297056 A1* | 12/2011 | Martin | A47B 3/06 |
| | | | 108/152 |
| 2013/0327256 A1* | 12/2013 | Glenn, II | A47B 13/00 |
| | | | 108/50.02 |
| 2013/0327569 A1* | 12/2013 | Stathis | H02G 3/0406 |
| | | | 174/650 |
| 2014/0265753 A1* | 9/2014 | Soper | A47B 21/06 |
| | | | 312/22 |

* cited by examiner

TABLE WITH RETRACTABLE POWER CABLES

This application claims the benefit of U.S. Provisional Application No. 62/222,403 filed 23 Sep. 2016, titled "Table with Retractable Power Cables," which is incorporated herein by reference for all purposes.

BACKGROUND

1. Field of the Invention

The present application relates to tables and other articles of furniture having integrated electrical power features.

2. Description of Related Art

Over the years, a variety of tables and other articles of furniture have been made available having electrical power outlets. Although great strides have been made in the area of furniture with integral power outlets, many shortcomings remain.

BRIEF DESCRIPTION OF THE DRAWINGS

FIG. 30—Perspective view of table frame with power adapters and cords installed and ready to be plugged in.

FIG. 31—Perspective view of bottom of power strip with power adapter cords plugged in.

FIGURE ANNOTATIONS

Figure 1:
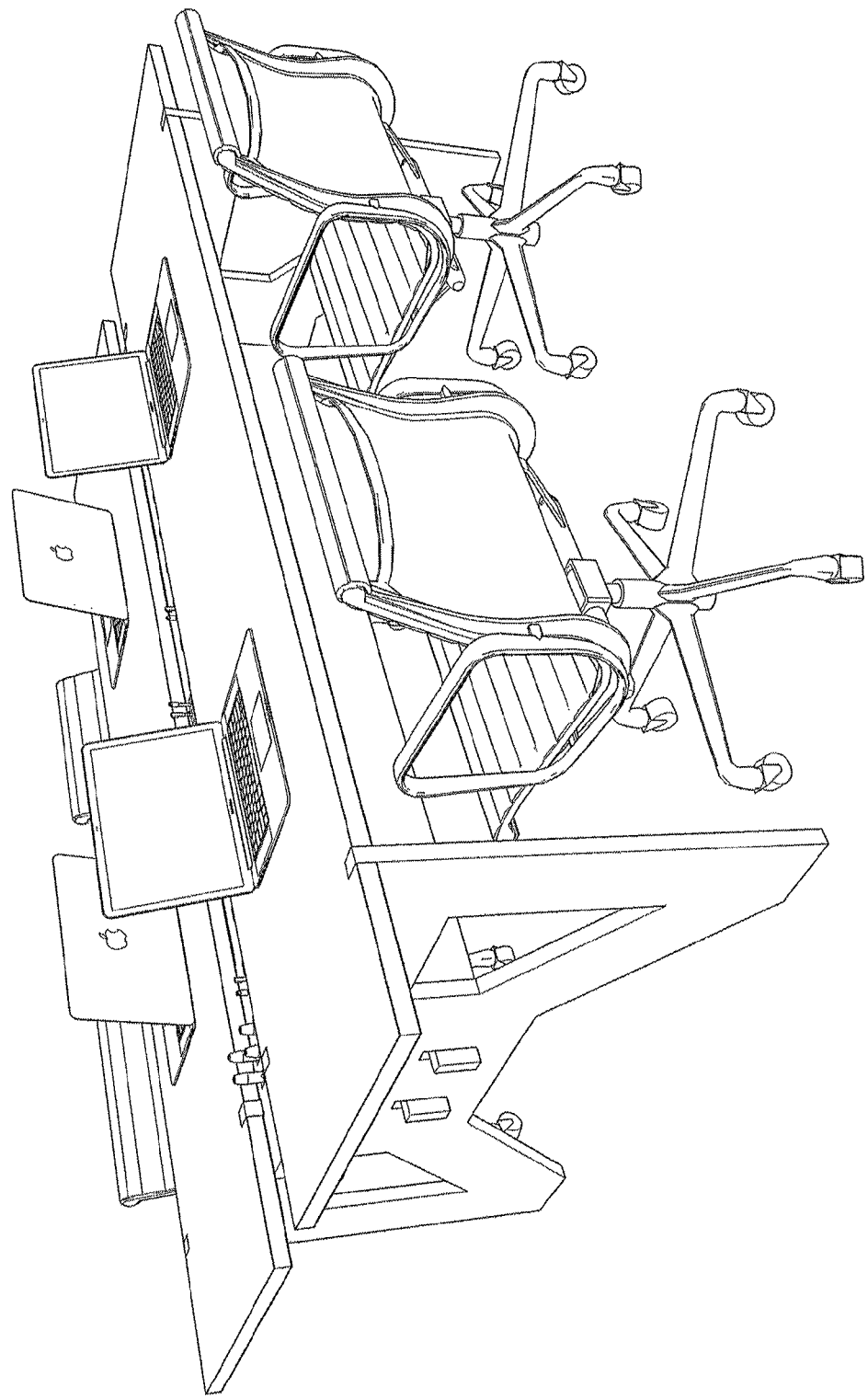
FIG. 1—Perspective view of table, shown in use with chairs and laptop computers.
Figure 2:
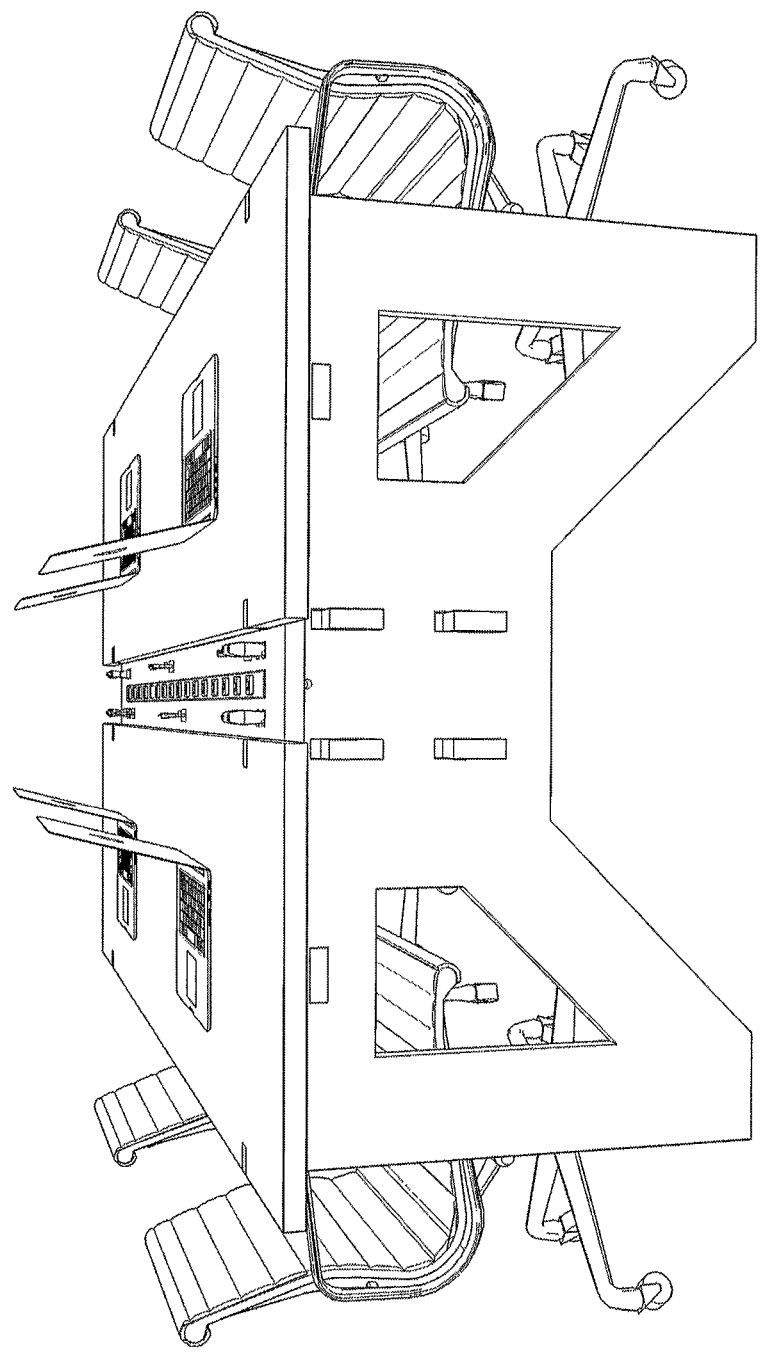
FIG. 2—Perspective view of end of table, shown in use with chairs and laptop computers.
Figure 3:
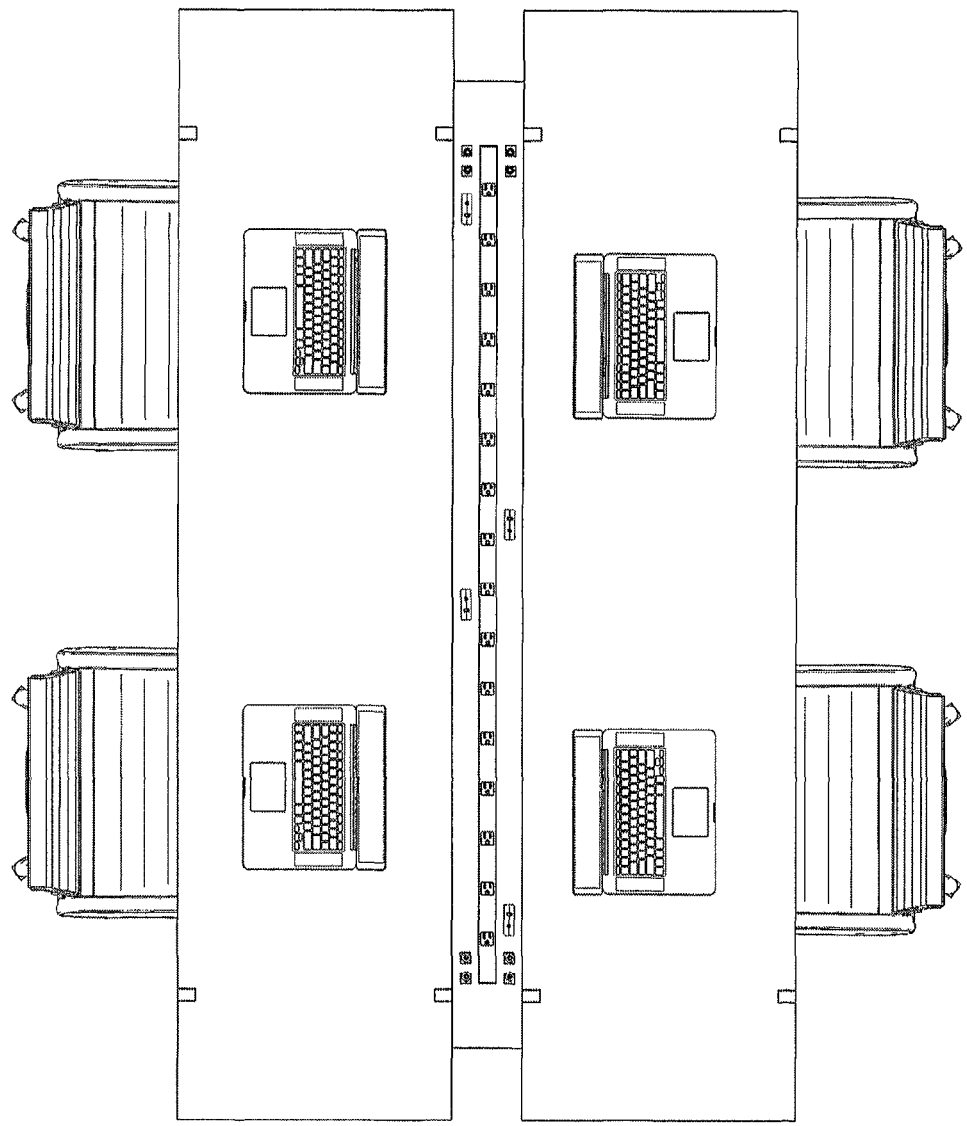
FIG. 3—Perspective view of top of table, shown in use with chairs and laptop computers.

- 102 Table Top
- 104 Center Panel
- 105 Table Top
- 106 Leg Panel
- 107 Shelf Panel
- 108 Stretcher Panel
- 109 Bottom Panel
- 110 Retractor Side Panel
- 112 Pull-box
- 114 Pulley
- 120 Pen Well Dado Groove
- 122 Pen Well Bottom Panel
- 124 Pen Well Side Panel
- 126 Cable Retractor Locator
- 130 Wood Grommet
- 132 Plastic Grommet Half
- 134 Plastic Grommet
- 142 Cable Cord (Wire and Sheath)
- 143 Cable Connector
- 144 Cable
- 150 Power Adapter Hanger
- 152 Cable Strain Relief Top Half
- 153 Cable Strain Relief Bottom Half
- 154 Pulley Bracket
- 160 Top Housing
- 162 Bottom Housing
- 164 Power Receptacle
- 166 Power Cord
- 168 Thermal Breaker
- 170 Dry-Erase Pen Well
- 172 Dry-Erase Pen
- 180 Bottom Panel Dado Groove
- 182 Bottom Panel Slots
- 184 Bottom Panel Cable Holes
- 186 Cable Retractor Assembly Locator Slots
- 188 Cable Retractor Assembly Tabs
- 190 Cable Strain Relief Collar
- 192 Chamber
- 194 Strain Relief Rigid Member
- 196 Reset Button Access Port
- 198 Center Panel Support Port
- 200 Cable Retractor Assembly
- 202 Power Adapter
- 204 Power Strip Assembly
- 206 Clamping mechanism
- 208 Accessory power unit
- 210 Chamber Divider The Table One objective of the table is to provide a workspace for multiple users.

Another objective of the table is to provide an aesthetic workspace that is visually clean and uncluttered.

Another objective is to have an aesthetic workspace where everything is visually aligned and properly positioned.

Another objective of the table is to provide an abundance of power outlets for charging devices, with the outlets being convenient and easy to reach by each user.

Another objective of the table is to provide built-in power adapters for charging devices of various types, eliminating the need for users to supply plug-in chargers for their devices.

Another objective of the table is to accommodate power adapters of various types and sizes for powering and charging various types of devices.

Another objective of the table is to provide retractable cables for the power adapters to conceal excess cord when cables are not in use.

Another objective of the table is to be sturdy and strong.

Another objective is to make the table easy to move.

Another objective is to make the table easy to assemble.

Another objective of the table is to optimize raw material usage to minimize material waste and reduce costs.

Another objective of the table is to use off-the-shelf components where necessary and only produce custom components where absolutely necessary to achieve the desired functionality and aesthetics.

Another objective is to minimize the shipping costs for a table.

The objective of a workspace for multiple users is achieved by:

The spatial layout of the table frame maximizes leg room for all users.

Power strip outlets are easily reachable by all users,

Retractable cables are conveniently located for each user.

The objective of an aesthetic workspace that is visually clean and uncluttered is achieved by:

The spatial layout of the power strip and retractable cords is ordered and aesthetically pleasing. Everything is neatly packaged, and nothing looks out of place or looks like it was compromised.

The cable connectors are slightly subordinate to the desktops for a very clean experience. The power strip and retractable cable connectors are just low enough to appear distinctly separate from the table top but high enough to still be readily visible and easy to target when reaching for a cord or attempting to plug a cord or adapter into a power receptacle.

Built-in power adapters means users do not have to see wadded or coiled up power cords and adapter bricks sitting next to or in front of them.

The objective of having an aesthetic workspace where everything is visually aligned and properly positioned is achieved by:

The aesthetics strongly influence the design and layout of components such as the cable retractors, which in turn strongly influence the placement and orientation of the power adapters and cables. The unique design of the power strip and unique design and placement of the cable retractors allows the cables and power receptacles to be visually aligned and ideally spaced for an aesthetically pleasing, result.

The objective of an abundance of power outlets for charging devices, that are convenient and easy to reach by each user is achieved by:

The integrated power strip offers multiple outlets for each user in order to accommodate power users with multiple devices.

The integrated power strip can be double-sided in order to provide power outlets both on top of the table and downwards to the internal cable retraction mechanisms and associated power adapters within the table.

The objective of providing built-in power adapters for charging devices of various types is achieved by:

The spatial layout of the table frame allows cable retraction mechanisms and associated power adapters to be concealed.

The spatial layout provides space for retractors, power adapters and cables with sufficient cable extension length to be useful. In one particular version of the invention, there is space for at least eight retractable cables with a minimum of 42 inches of extension each, all contained within the table frame without impacting the users' leg or knee space and without reducing the available work space on the top of the table.

The objective of accommodating power adapters of various types and sizes for the various types of devices is achieved by:

The large central storage volume allows adapters of most any size and shape to be stored and concealed within the table, out of sight of the users.

Because a power strip with common wall power outlets may be provided in the table, nearly any power adapter can be used that is designed for plugging into a standard wall outlet. The power strip may of course be adapted to the world locale in which the table will be used, which then allows, for example, power adapters with German plugs to be utilized with a power strip that has German outlets.

The objective of providing retractable cables for the power adapters to conceal excess cord when cables are not in use is achieved by:

Custom retraction mechanisms, also referred to herein as one type of cord organizing member, withdraw excess cord and store it within the retraction mechanism to provide a clean and aesthetic work space free of excess and unsightly cords and cables.

The objective of the table being sturdy and strong is achieved by:

The tool-free design can utilize planar material of most any thickness, so strong hardwood plywood may be used for strength and durability.

There are no small parts or small details on the table frame or table tops than can be broken during assembly or by the user under normal use.

In one version of the invention, the desktops are supported on three sides for strength The objective of making the table easy to move is achieved by:

With a flat-pack design, individual panels may be moved more easily one at a time before assembly than moving a fully assembled item.

The objective of making the table easy to assemble is achieved by:

By providing tool-free assembly, an end user is able to assemble the table by themselves more easily than a table design that requires hardware and tools.

Cable retraction mechanisms may be installed without the need for tools.

The objective of optimizing raw material usage to minimize material waste and reduce costs is achieved by:

The overall dimensions of individual table panels is heavily influenced by the raw material dimensions and by the ability to divide the raw material into final table panels as evenly as possible with the minimal amount of drop or waste material.

The objective of using off-the-shelf components where necessary and only produce custom components where absolutely necessary to achieve the desired functionality and aesthetics, is achieved by:

Some components such as plastic pulleys needed to have extremely smooth surface finishes and be as minimally abrasive on cable sheathing as possible. Because these qualities are difficult to achieve with rapid prototyping and because plastic injection molding a custom part would be cost prohibitive, these components needed to be sourced from off-the-shelf parts.

In contrast, sheet metal is readily laser cut, bent and powder coated in small quantities, so it was possible to manufacture metal housings for a custom power strip to help achieve the goals that could not be achieved using off-the-shelf offerings.

The objective of minimizing the shipping costs for a table is achieved by:

While fully assembled furniture can be put to use immediately upon delivery, assembled furniture is typically expensive and difficult to transport because it consumes significant volume in a transport container and it may require multiple people to lift and maneuver it. By designing the table to be transported in a compact flat-pack state and assembled at the final destination, it minimizes transport costs by allowing the shipment to be categorized into a cheaper freight class.

Tool-Free and Non-Tool-Free Versions

The table may be designed in tool-free and non-tool-free versions. A tool-free version makes the assembly process easier for the end user because the user does not need to locate or purchase any tools in order to assemble and begin using the table, and the overall assembly process can be made faster. However, it can be more economical to utilize fasteners for assembly because there are fewer constraints on the shape and edge profiles of the panels which in turn, can improve raw material yield by allowing straight edges and the use of edge banding which may not be possible with tool-free joints such as tab and slot joinery.

Multiple versions of the table are possible by using various manufacturing and assembly techniques.

One particular version of the invention may incorporate tool-free assembly techniques such as tab and slot joinery that require no fasteners or tools for assembly.

Another particular version of the invention may utilize flat-pack fasteners such as snap-fit fasteners or thumbscrews and wing nuts that may be assembled and tightened by hand with no need for tools.

Another particular version of the invention may utilize flat-pack fasteners such as cam dowels and cam locks that require the use of a screw driver or hex wrench to tighten.

Another particular version of the invention may utilize traditional threaded fasteners that require a screwdriver or wrench for assembly.

Another particular version of the invention may be completely assembled by the manufacturer such that no additional assembly is required by the user.

Another particular version of the invention may utilize a combination of tool-free and non-tool-free assembly methods that may utilize fasteners.

Configurations

The table may be constructed in numerous unique configurations with combinations of:

Power strips
Retraction mechanisms
Power strips+cable retraction mechanisms
Cable concealment methods
Power strips+cable concealment methods
Tool-free, traditional joinery or a combination thereof In one particular version of the invention, the table includes:
a frame that supports one or more table tops, and
an integrated power strip In one particular version of the invention, the table includes:
a frame that supports one or more table tops, and
an integrated power strip, and
the table may be assembled without the need for any tools.

In one particular version of the invention, the table includes:
a frame that supports one or more table tops, and
an integrated power strip, and
one or more power adapter cord retraction mechanisms In one particular version of the invention, the table includes:
a frame that supports one or more table tops, and
an integrated power strip, and
one or more power adapter cord retraction mechanisms, and
the table may be assembled without the need for any tools.

In one particular version of the invention, the table includes:
a frame that supports one or more table tops, and
one or more storage areas for
concealing one or more power chargers, and
concealing excess cord by allowing a user to tuck excess cord back into the storage area.

In one particular version of the invention, the table includes:
a frame that supports one or more table tops, and
one or more storage areas separated by chamber dividing walls, also referred to herein as cord organizing members, for
concealing one or more power chargers, and
concealing excess cord by allowing a user to tuck excess cord back into the storage area,
and the table may be assembled without the need for any tools.

In one particular version of the invention, the table includes:
a frame that supports one or more table tops, and
an integrated power strip, and
one or more storage areas for
concealing one or more power chargers, and
concealing excess cord by allowing a user to tuck excess cord back into the storage area In one particular version of the invention, the table includes:
a frame that supports one or more table tops, and
an integrated power strip, and
one or more storage areas for
concealing one or more power chargers, and
concealing excess cord by allowing a user to tuck excess cord back into the storage area
and the table may be assembled without the need for any tools In one particular version of the invention, the accessory power unit includes:
a frame, and
an integrated power strip, and
one or more power adapter cord retraction mechanisms In one particular version of the invention, the accessory power unit includes:
a frame, and
an integrated power strip, and
one or more storage areas for
concealing one or more power chargers, and
concealing excess cord by allowing a user to tuck excess cord back into the storage area Table Components Table Frame The table frame provides support for the table tops 102 and cable retraction mechanisms 200 within the table.

In one particular version of the invention, the frame is formed by two leg panels 106 connected by two stretcher panels 108. These panels form an enclosed space that may house optional cable retractor mechanisms 200 along with associated wires and cables.

In one particular version of the invention, the space is substantially closed on the bottom to prevent access to the internal cable retractors 200 and associated wires and cable to prevent damage to these components. The panel may also provide locating means for one or more cable retractors 200. In one particular version of the invention, the bottom panel 109 has slots 182 that locate and hold cable retractors 200 in place by mating with matching tabs 188 on the bottoms of the cable retractors side panels 110.

The enclosed space that houses the integrated power strip 204 and optional cable retractor mechanisms 200 is compact. The narrowness of the cable retractor storage space minimizes the surface area above the space, making it less visually obtrusive and minimizing the distance that users must reach over the table tops to plug devices into the power strip. The narrowness of the cable retractor storage space helps maximize the amount of knee space next to it for users. The shallow depth of the cable retractor storage space helps maximize the amount of foot and leg room below it for users.

In one particular version of the invention, the table frame can be manufactured entirely from planar material. This is particularly beneficial for manufacturing using readily available plywood or other sheet materials such as acrylic or sheet metal that can be cut using CNC (computer numerical control) machines such as routers, lasers, plasma cutters or water-jet cutters. Planar material may also be cut by hand without the need for any CNC equipment using a jigsaw or hand router, and templates may even be used to improve manufacturing efficiency, repeatability, consistency and accuracy.

Figure 50:
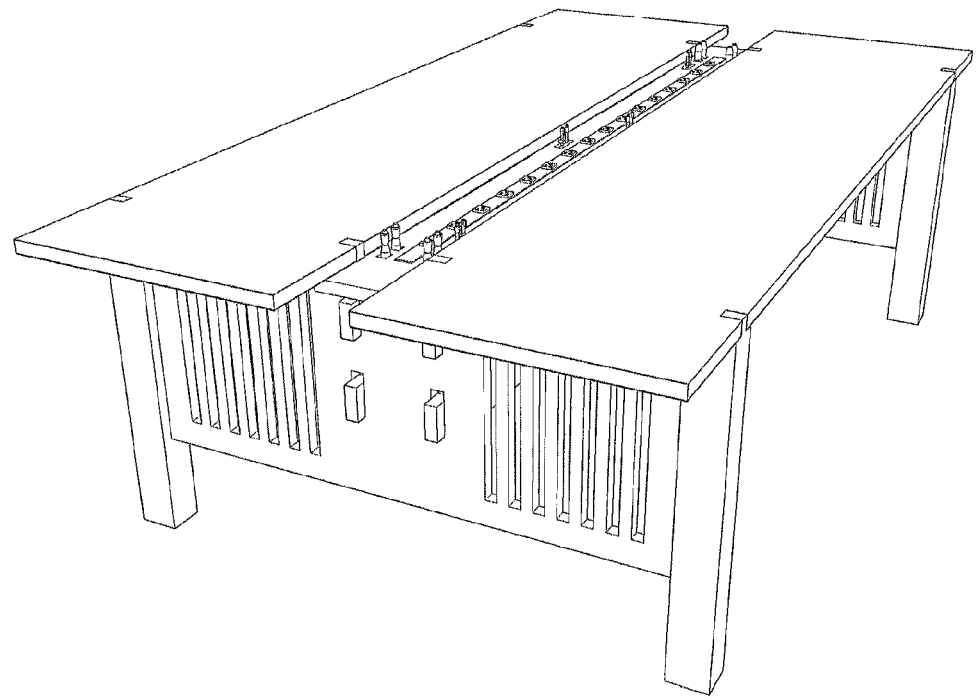
FIG. 50—Perspective view of table, shown with Mission-style legs with "posts" that might utilize traditional joinery during the manufacturing process to produce the thicker three-dimensional appearance.

In one particular version of the invention, the table frame may be manufactured using traditional joinery techniques where some or all components are pre-assembled by the manufacturer using glue and fasteners such as screws, brads or nails. For example, the table legs might be manufactured using a combination of plywood and dimensional lumber to produce an aesthetic three-dimensional design with varying thicknesses, as illustrated in FIG. 50. This three dimensional design could be assembled to other panels using tool-free joinery as shown in FIG. 50, or they could be assembled to other panels using fasteners.

Figure 57:
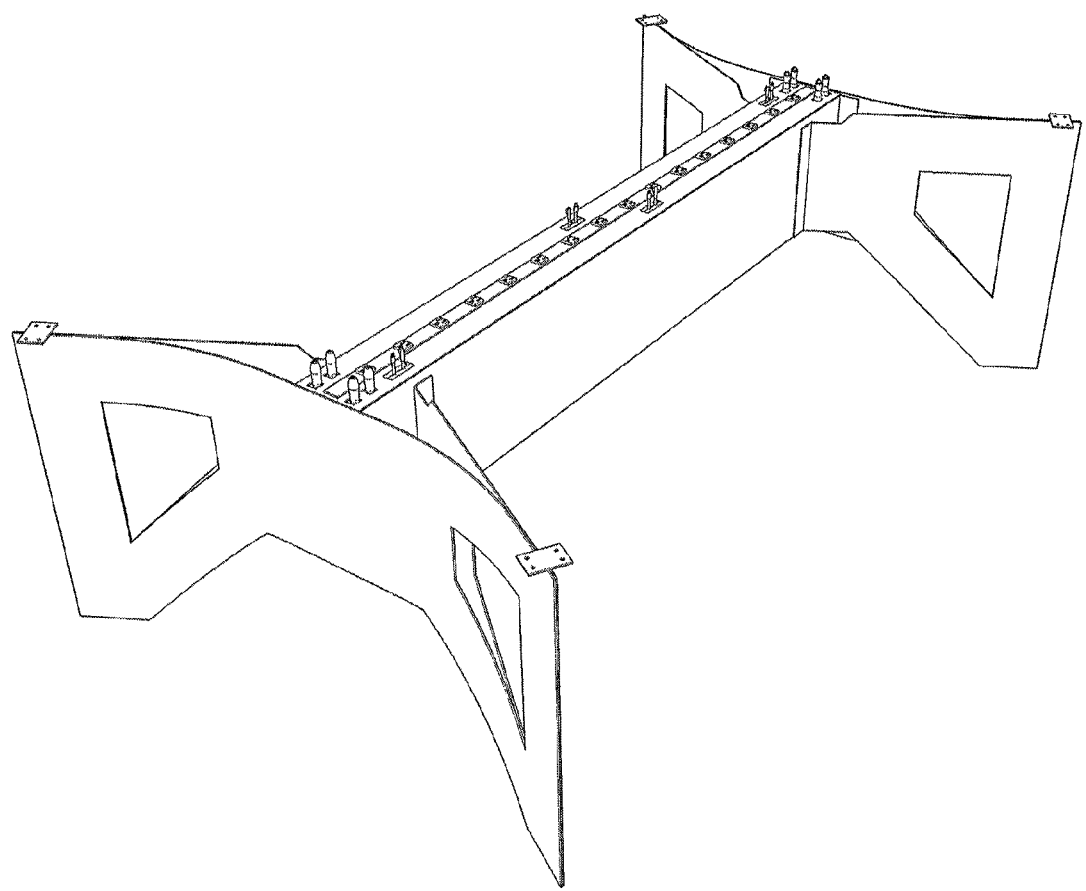
FIG. 57—Perspective view of table frame that utilizes sheet metal in the table frame.

In one particular version of the invention, the table frame may be manufactured from cut and formed sheet metal as shown in FIG. 57. The use of sheet metal allows thin and lightweight material to be bent and formed into three-dimensional shapes that inherently provide significant strength and support, in much the same way that very thin aluminum may be formed into a cylinder like a soda can that can support the weight of a person standing on top of it. The table frame may have some or all of its component parts manufactured from sheet metal, and may incorporate tool-free joinery techniques or hardware for assembly.

Leg Panel

In one particular version of the invention, the leg panels 106 provide support for the stretcher panels 108, the center panel 104 and the table tops 102. In this particular version of the invention, the stretcher panels 108 allow room underneath the center section for users' feet and to stretch their legs, and it reduces the amount of raw material required for manufacture of the table by eliminating unnecessary support material.

In another particular version of the invention, the stretcher panels 108 may extend down to the floor to provide additional support and stability, or to provide privacy between the sides of the table so that users feet and legs do not encroach on each other's spaces.

A leg panel 106 may provide one or more holes, cutouts or indentions for access to the inside of the center storage space. In one particular version of the invention, the leg panel has a U-shaped port 196 just below the center panel 104 to allow the user to depress the reset button of a thermal breaker 168 in the power strip 204 should the power strip's electrical current demand exceed its capacity and trip the breaker 168. This eliminates the need to partially or fully disassemble the table for access to a reset mechanism.

A leg panel may provide a mechanism for supporting the center panel during the table's assembly. In a particular version of the invention, the leg panel 106 has one or more recessed ports 198 on its upper edges. This recessed port 198 provides support for the center panel 104 and holds it upright during assembly, making it easier for a user to plug power cords and power adapters into the power strip 204 before lowering the center panel 104 into place. This makes it possible for a single person to assemble a table without help because the center panel 104 is securely supported, eliminating the chance of it sliding or falling over assembly and possibly damaging its surfaces.

Center Panel

The center panel 104 may contain a power strip, zero or more grommets 134 for integrated cable retractors or concealed cables, and zero or more storage wells 170 for dry-erase marker pens. The dry-erase marker pen wells 170 are most useful when marker board laminate is used for table top 102 surfaces, and the pen wells may be eliminated from the center panel during manufacture if a table is constructed with table tops made from some other material such as butcher block.

The location of the dry-erase marker pen storage wells 170 takes advantage of unused volume in the center of the table. The marker pens 172 may be dropped partially through the center panel 104 to rest on a surface below the center panel. The convenient location of the marker pen wells enables users to reach and grab a pen when needed. Locating dry-erase marker pen wells 170 at both ends of the table provides convenient access for all users.

The mechanical design and spatial layout of the cable retractors 200 allows the dry-erase marker pen wells 170 and the cable grommets 134 to be aligned along a straight line, producing an aesthetic design that is attractive and visually appealing. The marker pen openings in the center panel are sized to accommodate common dry-erase pens 172. The cable grommet 134 dimensions are sized to match the marker pen opening dimensions, contributing to the aesthetics.

In one particular version of the invention, the center panel 104 sits recessed below the table tops 102. A benefit of a recessed center panel is that it eliminates any visual divider between users on opposite sides of the table which could deter collaboration. Another benefit of a recessed center panel is that nothing gets in the way of the user and items used on the table tops—there is no need to rest equipment partially over an outlet, grommet or slot that might occur if the center panel were flush with or proud of the table tops. Another benefit of the recessed center panel is that all of a user's power plugs and adapters are located behind the table tops' rear edges and completely out of the user's way. Another benefit of a recessed panel is that is more visually recessive, emphasizing the table tops more.

The cable retractors 200 and corresponding cable grommets 134 can be oriented and positioned to minimize the length of cable 142 needed to be extended from a retractor to reach a user's device. Alternately, the cable retractors 200 and corresponding cable grommets 134 can be oriented and positioned to cluster the cables for visual preference.

In one particular version of the invention, the cable retractors 200 and corresponding cable grommets 134 are oriented so that the cables exit the center panel 104 closest to the left rear edge of each user's laptop computer, as seen by the users when sitting at the table.

In another particular version of the invention, the cable retractors 200 and corresponding cable grommets 134 can be oriented so that the cables exit the center panel 104 closest to the right rear edge of each user's laptop computer, as seen by the users when sitting at the table.

In another particular version of the invention, the cable retractors 200 and corresponding cable grommets 134 can be oriented so that the cables exit the center panel 104 closest to the middle of the center panel. This has the effect of visually grouping the all cables in the middle of the tables.

In another particular version of the invention, the cable retractors 200 and corresponding cable grommets 134 can be oriented so that the cables exit the center panel 104 closest to the ends of the center panel. This has the effect of visually grouping half of the cables on one end of the table and the other half on the opposite end of the table.

Bottom Panel

In one particular version of the invention, the table frame has a bottom panel that encloses the center space.

Figure 4:
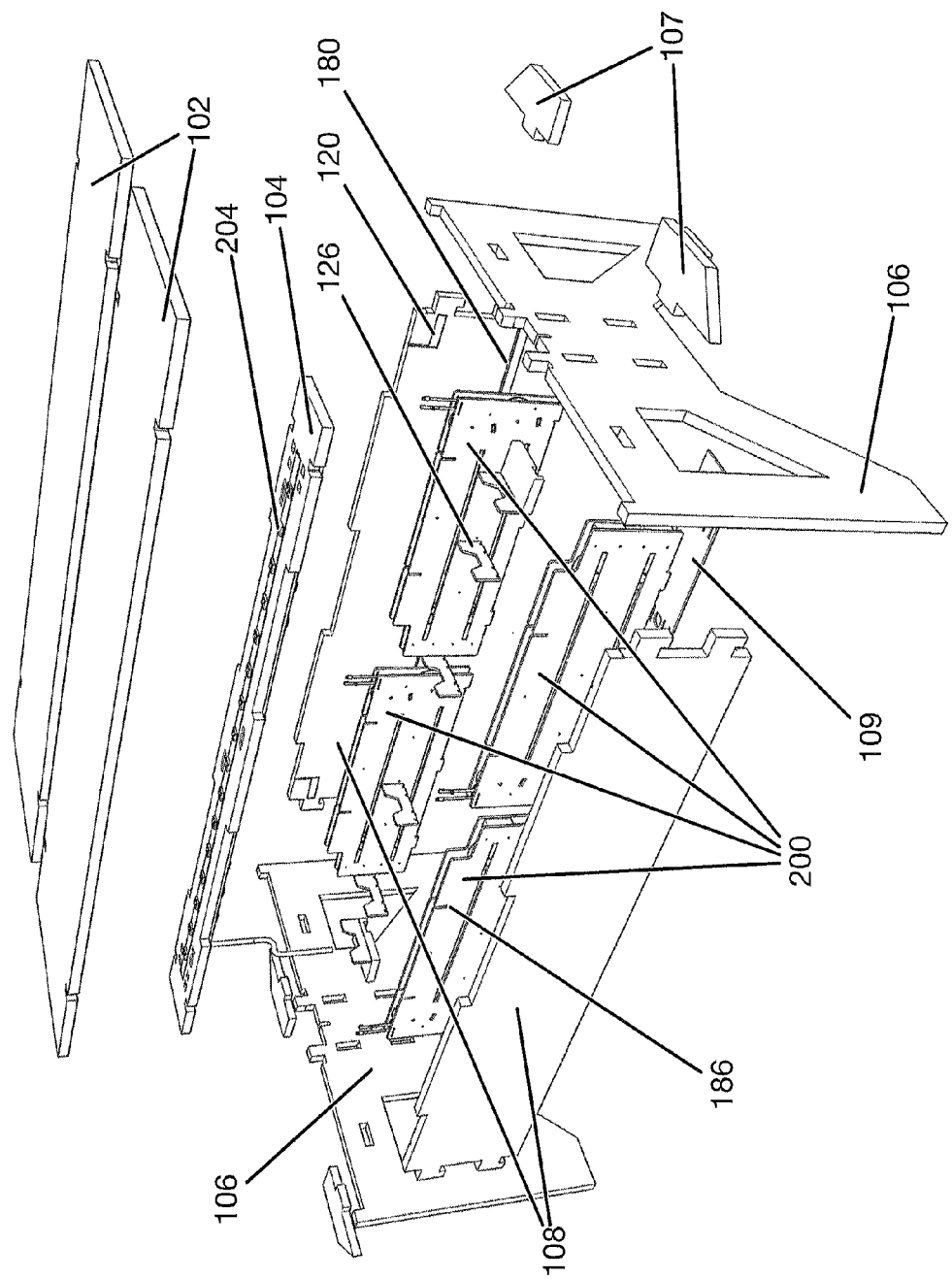
FIG. 4—Exploded view of table components.
Figure 5:
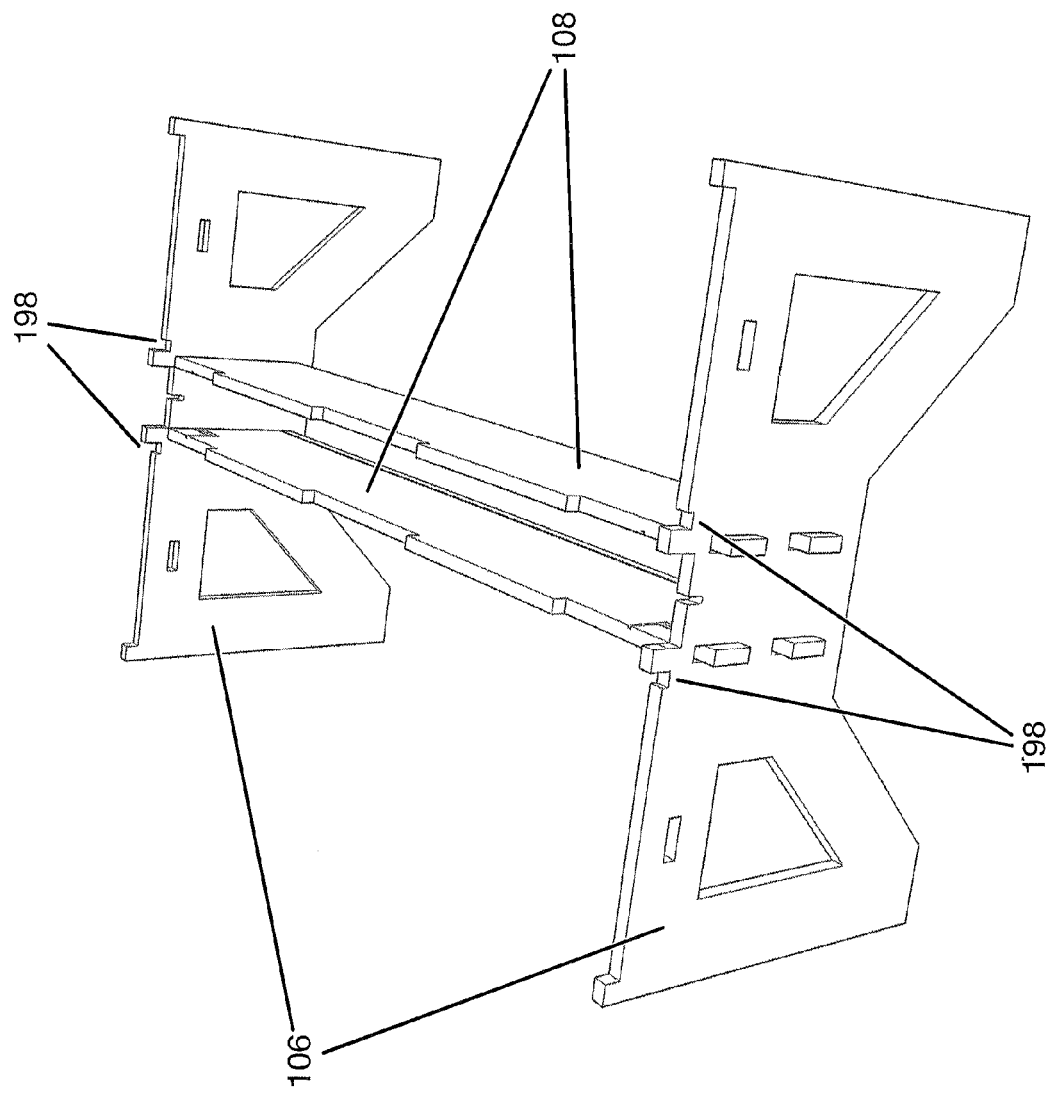
FIG. 5—Perspective view showing two leg panels and two stretcher panels assembled to form a table frame.
Figure 6:
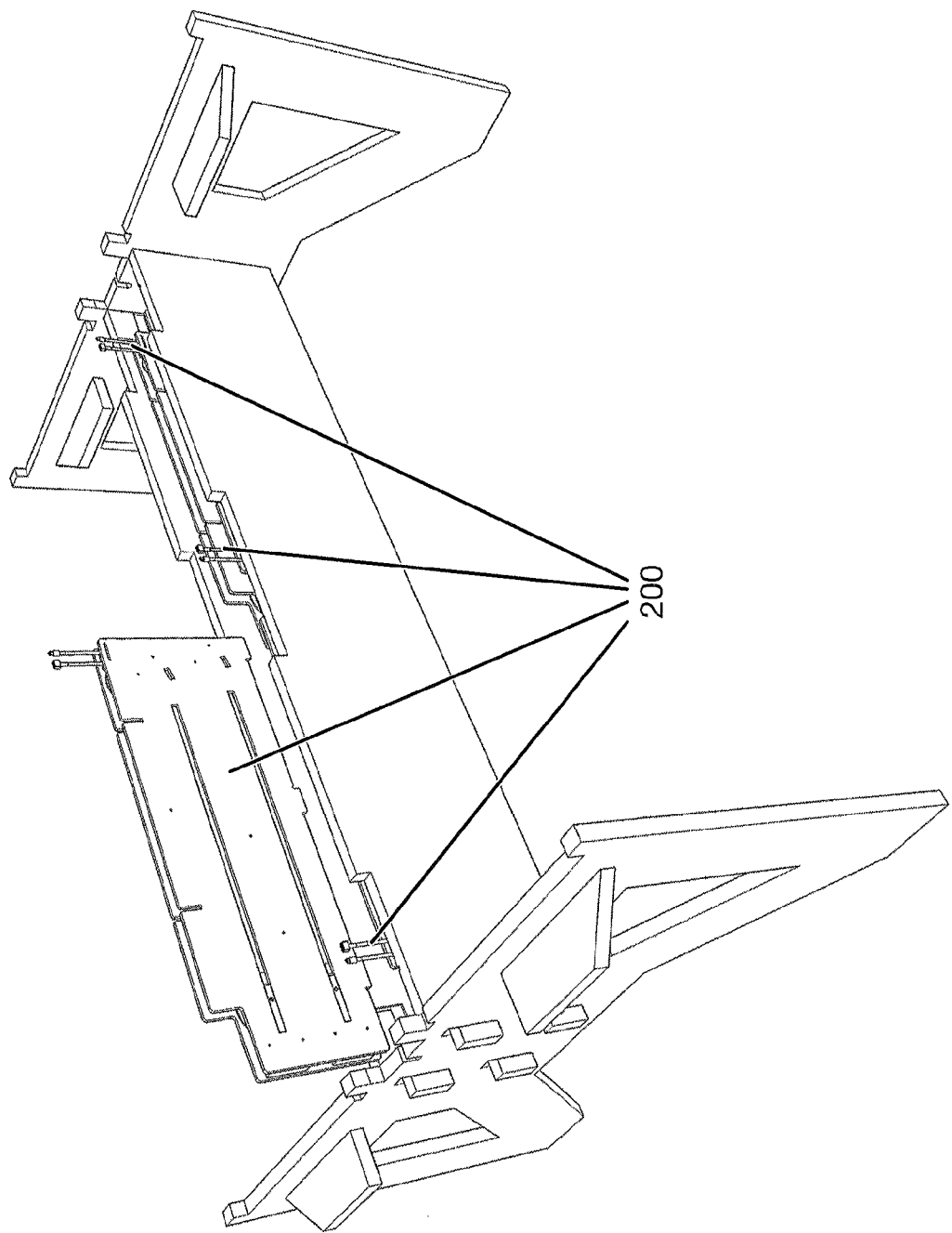
FIG. 6—Perspective view showing a cable retractor being installed into a table.
Figure 7:
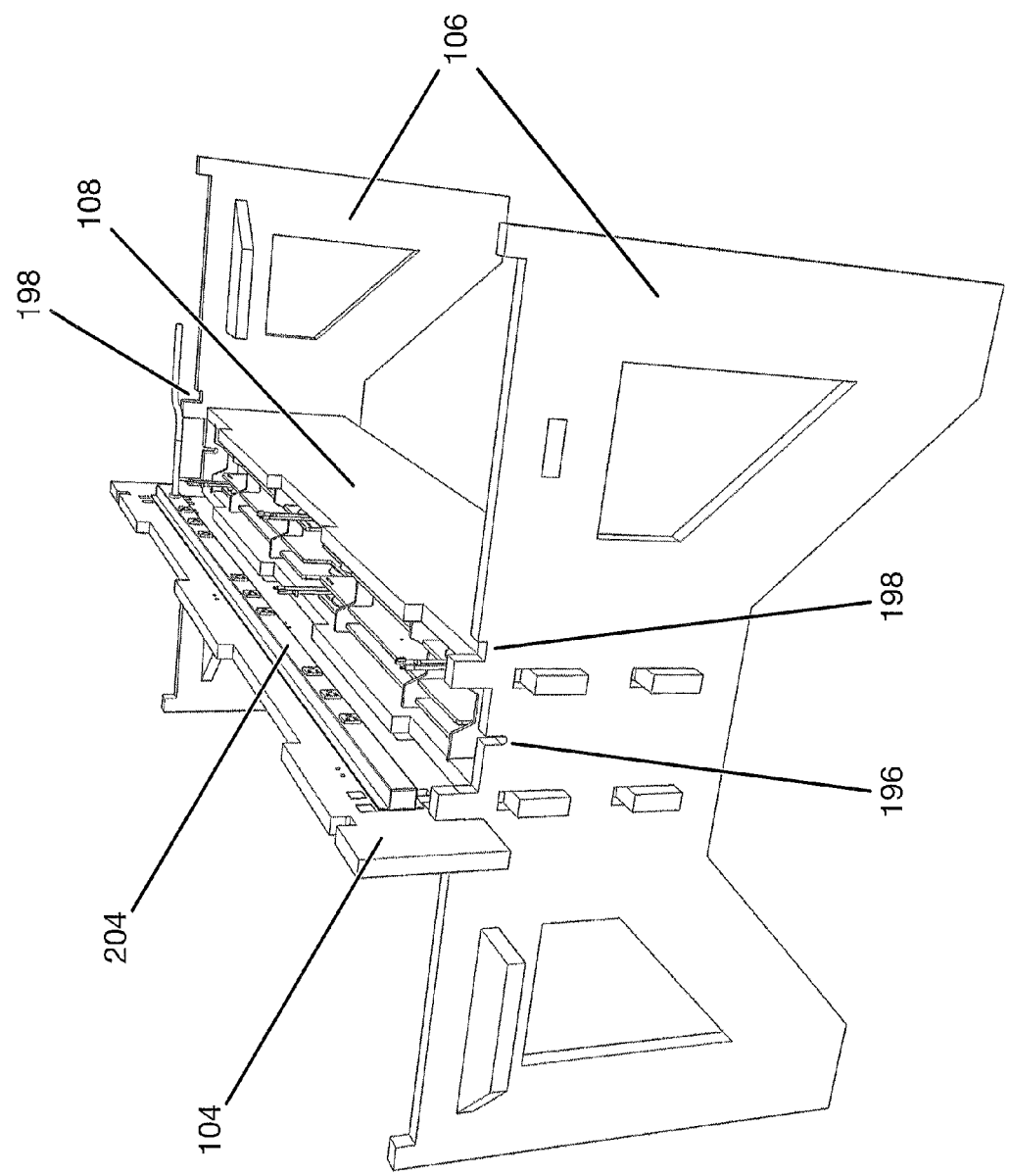
FIG. 7—Perspective view showing indentations in leg panel for supporting the center panel during installation.

In one particular version of the invention, the bottom panel 109 is located in the table frame by dado grooves 180 in each stretcher panel 108, as shown in FIG. 4.

However, alternate versions of the invention may have a bottom panel supported by other methods. One alternate method utilizes a stringer attached to the inside surface of each stretcher panel 108 on which the bottom panel may rest. Another alternate method utilizes multiple wood dowels inserted into the inside surface of each stretcher panel 108 on which the bottom panel may rest. Another alternate method utilizes a bottom panel formed to have sides which may be fastened to the inside surface of each stretcher panel 108 with hardware. This may be accomplished by utilizing sheet metal for the panel and bending it to form flanges on the sides, or it may be accomplished by assembling vertical strips of material along the edges of planar material such as plywood to form a "U"-shaped assembly that is fastened to the inside surface of each stretcher panel 108. In another alternate method, the bottom panel is attached to the bottom edges of each stretcher panel 108 with fasteners.

In one particular version of the invention, the bottom panel acts as a locator for the cable retractor mechanisms.

The slots 182 in the bottom panel reduces the complexity of the cable retractor assembly 200 by providing a spacing means for the retractor side panels 110, eliminating some of the spacers required to keep the retractor side panels 110 spaced apart properly. The slots 182 in the bottom panel locate the tabs 188 on the lower edges of the retractor side panels 110, eliminating the need for spacers along the bottom of the retractor assembly 200.

In an alternate version of the invention, the bottom panel may be eliminated, and one or more cable retractors may be supported by other methods. In one alternate method, the cable retractor is directly attached to the stretcher panel with hardware. In another alternate method, a stringer is attached or formed on the inside surface of each stretcher panel on which one or more cable retractors may rest. In another alternate method, one or more cable retractors is attached to the bottom surface of the center panel with hardware.

Table Tops

The table top panels 102 may be made of any kind of material, some examples including butcher block, solid surface material such as Corian, plywood, plywood with laminate applied to it, particle board with laminate applied to it, MDF and MDF with laminate applied to it.

In one particular tool-free version of the invention, tab and slot joinery allows either side of a table top panel to be used as the upper surface because both surfaces may be flat and free of openings or receptacles required for fasteners. This reversibility allows both sides of a top panel to be made cosmetic and functional. Should one side become damaged, the top may be flipped over to extend the table's useful life. This is advantageous with surface materials such as dry-erase marker board laminate where the surface material has low abrasion resistance that results in a shorter usable lifespan than can be achieved with other table top surfaces. For example, laminate rated for vertical use may not be as durable when it is used in horizontal applications like table tops. Also, opposite sides of the top panel may be finished with different materials or colors, allowing the end user to vary the look of the table simply by flipping a top panel over.

In one particular version of the invention, the table frame supports the table tops 102 along three edges which provides a uniformly flat work surface because the surface is supported under its back edge along most of its length, minimizing drooping that can occur when surfaces are only simply supported near or at each end.

In one particular version of the invention, the table tops 102 are laminated with dry-erase marker board laminate, allowing users to write on the tops with dry-erase marker pens and to easily erase their writings, as shown in FIG. 64.

In one particular version of the invention, the table tops 102 are reversible and laminated on both sides with dry-erase marker board material which allows a top to be flipped over if one side becomes damaged and can no longer be used for marking with dry-erase pens.

Figure 49:
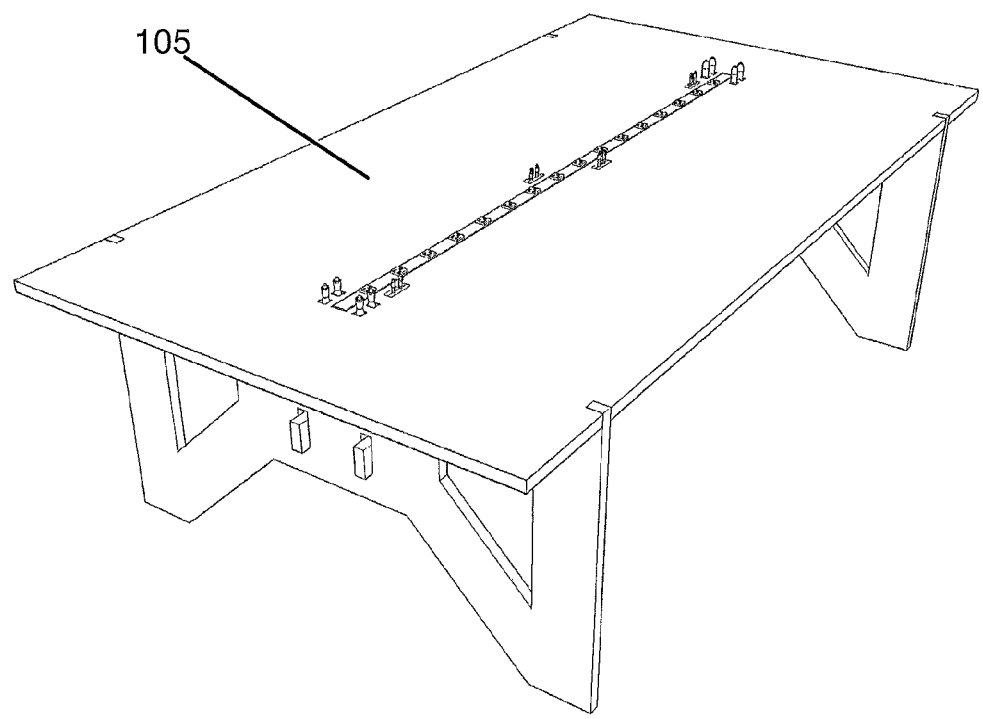
FIG. 49—Perspective view of table, shown with a continuous table top.

In one particular version of the invention, the table top 105 is one continuous surface with one or more openings formed into it for one or more power outlets and cables, as shown in FIG. 49.

Power Strip

Outlets can be provided on upper and lower table surfaces. Outlets on upper table surfaces provide power for devices used on top of the table, while outlets on lower table surfaces provide power to devices below the table tops such as cable retractors and/or any other equipment that is stored within or under the table.

Outlet receptacles on lower table surfaces allows cords and adapters to be plugged in upside-down, which allows cords to hang from the power strip. The tension of the female power outlet sockets is typically sufficient to support the weight of short cords and small power adapters that are plugged into them without requiring any further retention mechanism for the cords or adapters. This simplifies assembly because all cords may be plugged into the power strip while the power strip is out and easily accessible, eliminating the need to reach into narrow spaces at the bottom of the table to plug in cords. This also minimizes the amount of excess cord that bunches up in the bottom of the center space and that must be bundled-up to prevent interference with other cords and cable retractor mechanisms. When cords are plugged in upside-down, the cords drape downward from the power strip toward their destination, consuming some of their length and reducing the amount of excess cord in the table. Ideally, the cord lengths can be optimized such that they can be plugged into the power strip and no excess cord touches the bottom of the table.

Different numbers of outlets are possible on the upper and lower table surfaces. Outlets can be provided on upper surfaces in any quantity needed or desired for any types of devices, especially those not supported by any included built-in chargers. Because the outlets are separate from those on lower surfaces, the outlets can be arranged and optimized for use on top of the table, grouped for convenience for each user, for example. Outlets can be provided on lower surfaces in any quantity necessary to power any concealed cable retractors and/or concealed power adapters. Because the outlets on the lower surfaces are separate from those on upper surfaces, the outlets can be arranged and optimized for devices within or under the table.

Outlets on upper and lower table surfaces can be provided by one or more power strips that are double-sided with outlets on both upper and lower surfaces. One benefit of a single power strip with outlets on both the upper and lower surfaces is that it can be made more compact than multiple power strips with outlets on only one side of each, minimizing the total amount of space required for all receptacles. Another benefit of a single power strip with outlets on both the upper and lower surfaces is that one double-sided power strip simplifies manufacturing and packaging by reducing the total component count, requiring only one power strip instead of multiple. Another benefit of a single power strip with outlets on both the upper and lower surfaces is that one double-sided power strip simplifies assembly of the table by requiring the mounting of only a single power strip instead of multiple ones.

Figure 45:
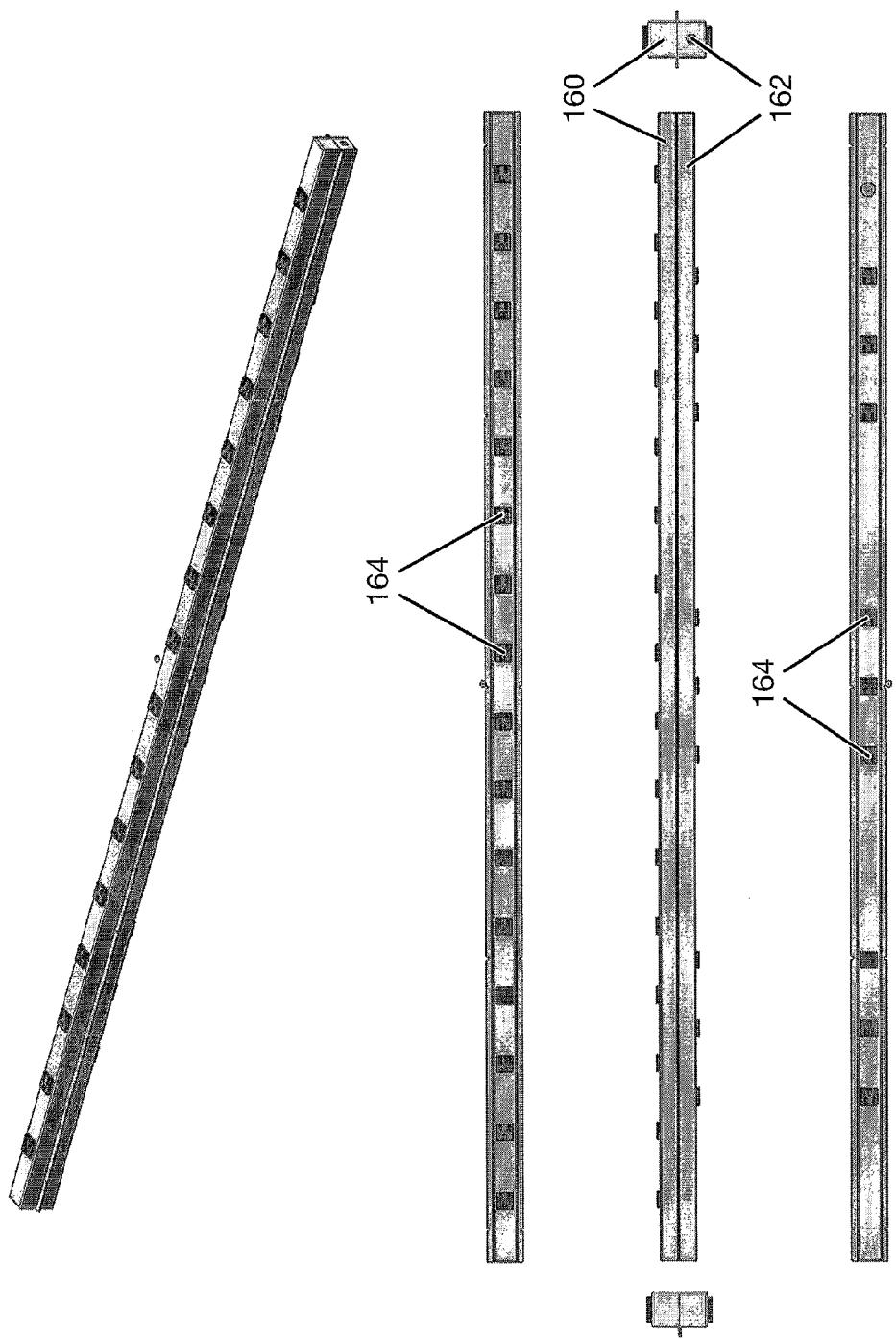
FIG. 45—Orthographic and trimetric views of a power strip (shown without power cord and thermal breaker).

A double-sided power strip enclosure may be produced using symmetrical housings as shown in FIG. 45. Economies of scale can be achieved because symmetry may allow the upper housing 160 and lower housing 162 to be made from the same component. The housing component may be produced in a base form and then customized in a secondary operation for use as an upper or lower housing with a different number of outlets or holes possible in each. Alternately, the upper and lower housings may be stamped or laser cut uniquely and then formed using the same sheet metal bending die setup. In one particular version of the invention, sheet metal is laser cut to form the upper housing 160 with one particular quantity of 110 v power receptacles and the lower housing 162 with a different number of 110 v power receptacles plus holes for the power cord 166 and thermal breaker 168, then both housings are formed from the laser-cut sheet metal using the exact same bending die set-ups.

Figure 22:
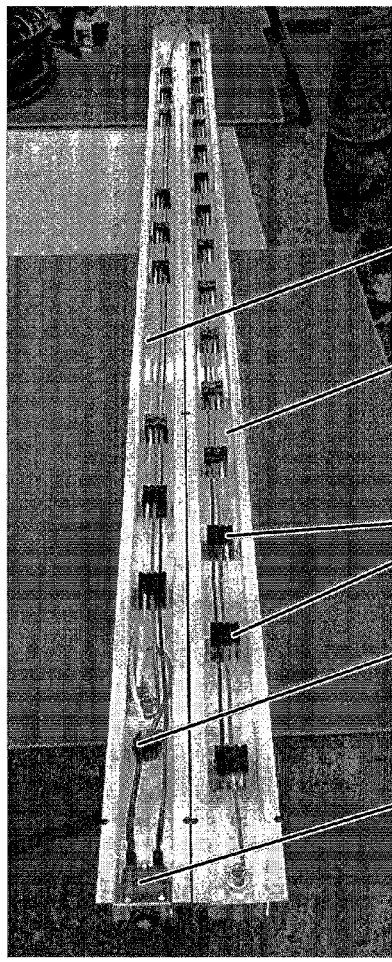
FIG. 22—Perspective view of inside of fully assembled power strip.
Figure 23:
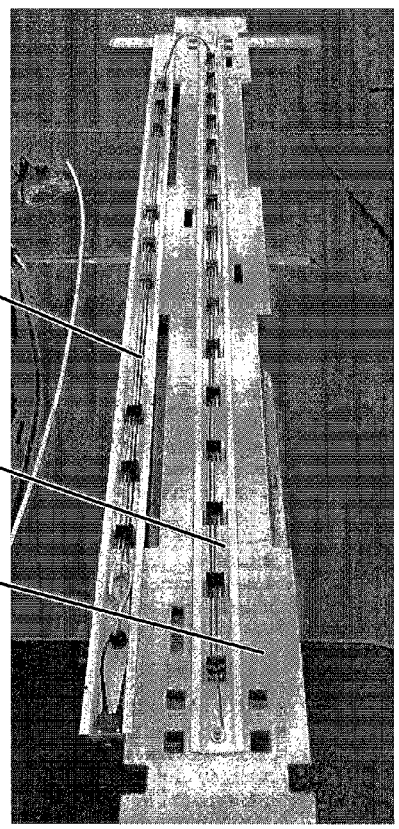
FIG. 23—Perspective view of inside of fully assembled power strip, installed in center panel.
Figure 24:
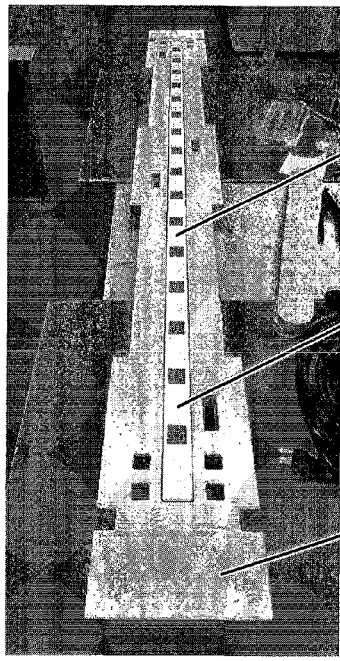
FIG. 24—Perspective view of top of fully assembled power strip, installed in center panel.
Figure 25:
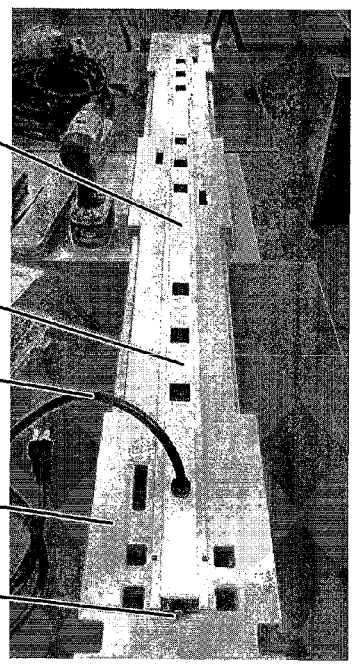
FIG. 25—Perspective view of bottom of fully assembled power strip, installed in center panel.
Figure 26:
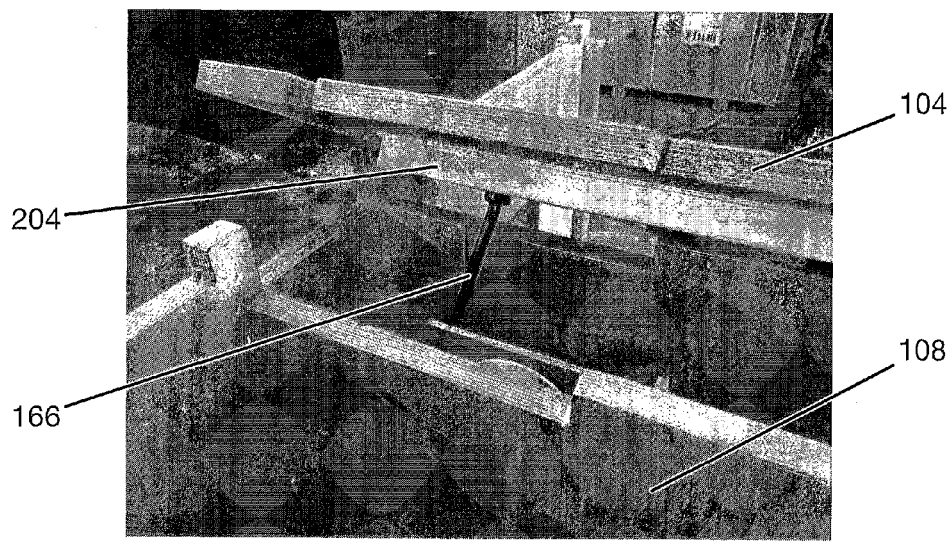
FIG. 26—Perspective view of a center panel with a fully assembled power strip, being installed in a table frame.
Figure 27:
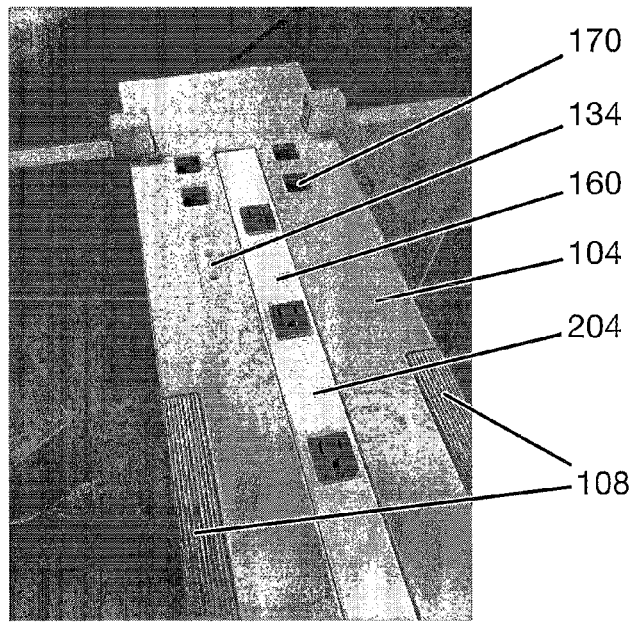
FIG. 27—Perspective close-up view of a center panel with a fully assembled power strip, installed in a table frame.
Figure 28:
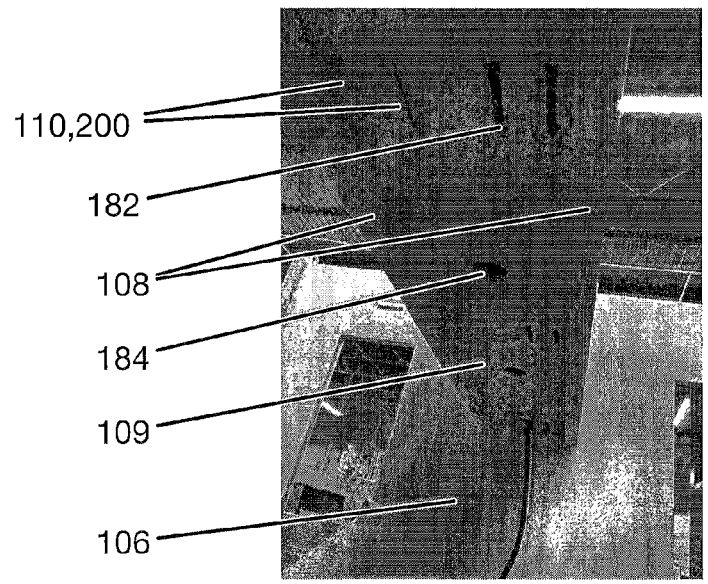
FIG. 28—Perspective view of bottom panel that supports cable retractor mechanisms in the center space of a table frame. Power strip power cord shown exiting through grommet hole.
Figure 29:
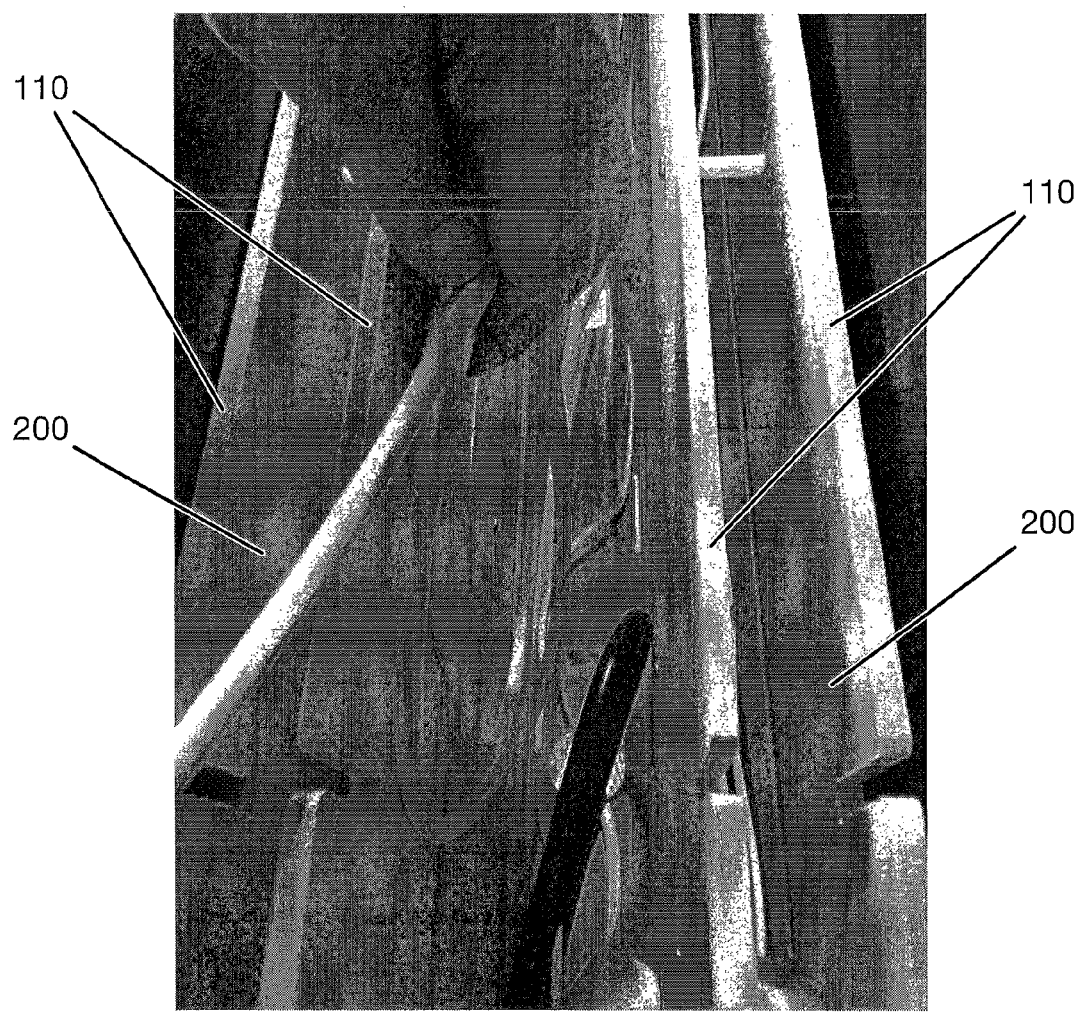
FIG. 29—Perspective view of power adapter cords being coiled-up for installation between cable retractors in a table.
Figure 30:
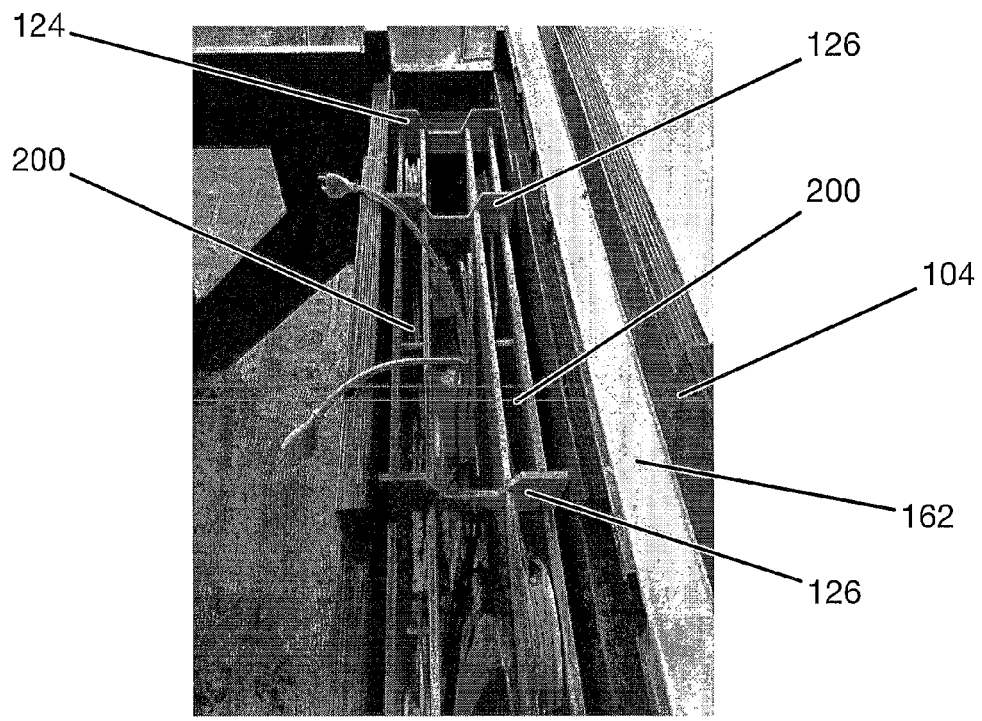
Figure 31:
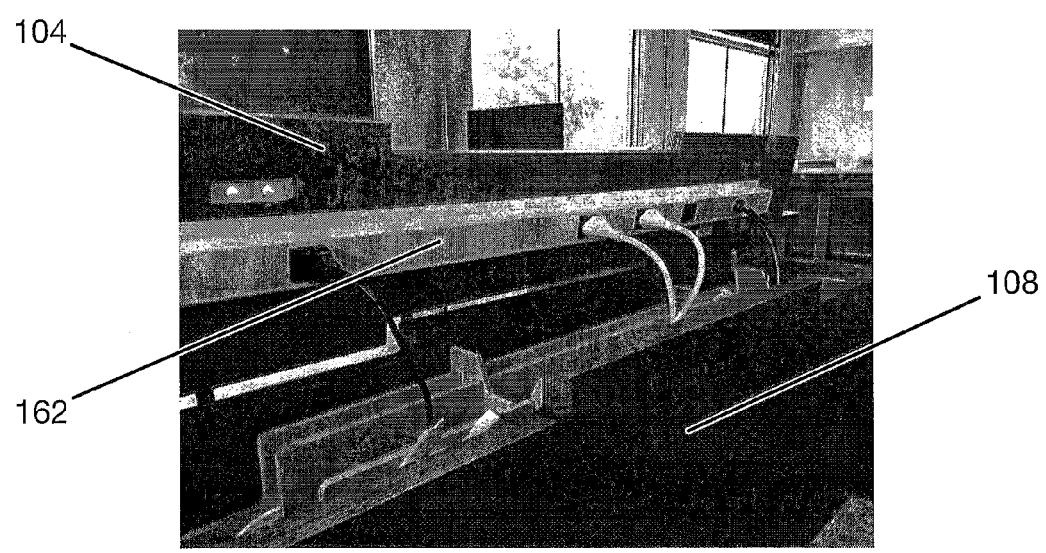
Figure 32:
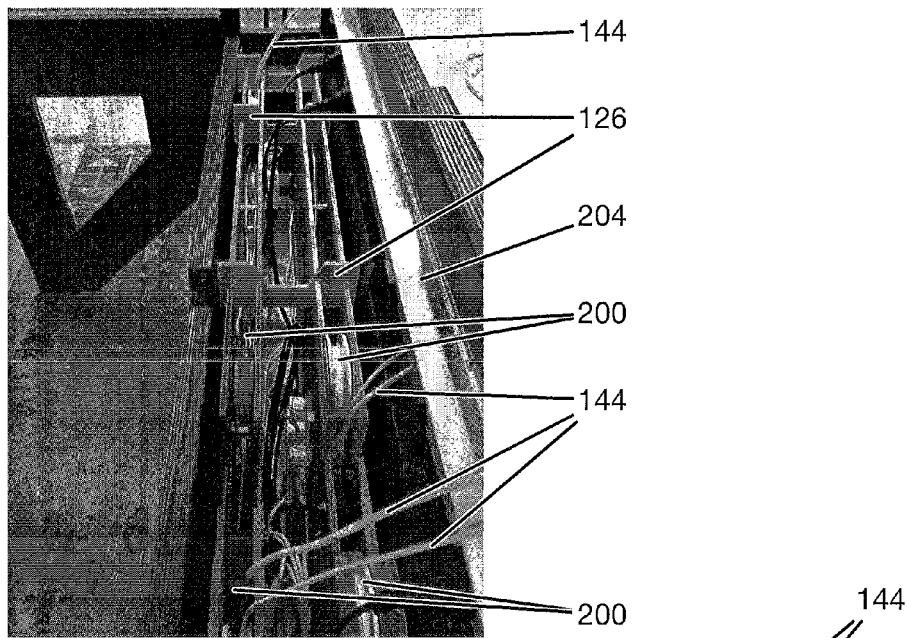
FIG. 32—View of center of table with all cable retraction mechanisms installed and power adapters installed and plugged into power strip. Laptop power adapter support brackets shown.
Figure 33:
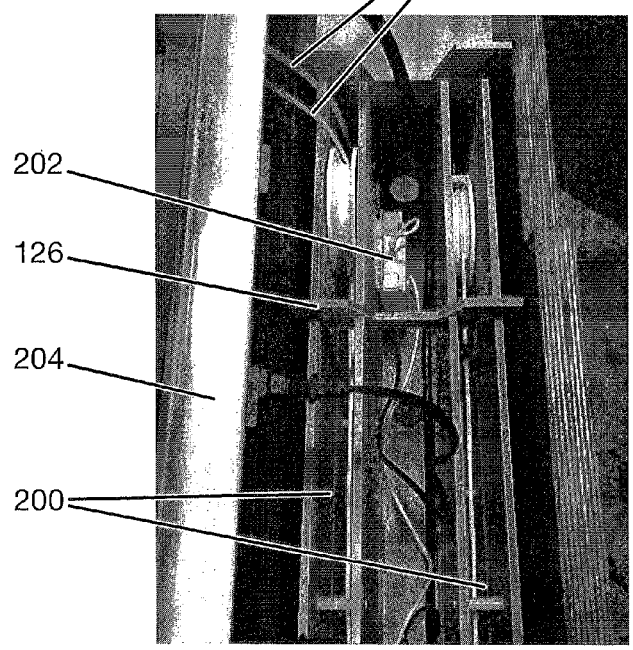
FIG. 33—Close-up view of laptop power adapter support bracket installed on side of cable retraction mechanism.
Figure 34:
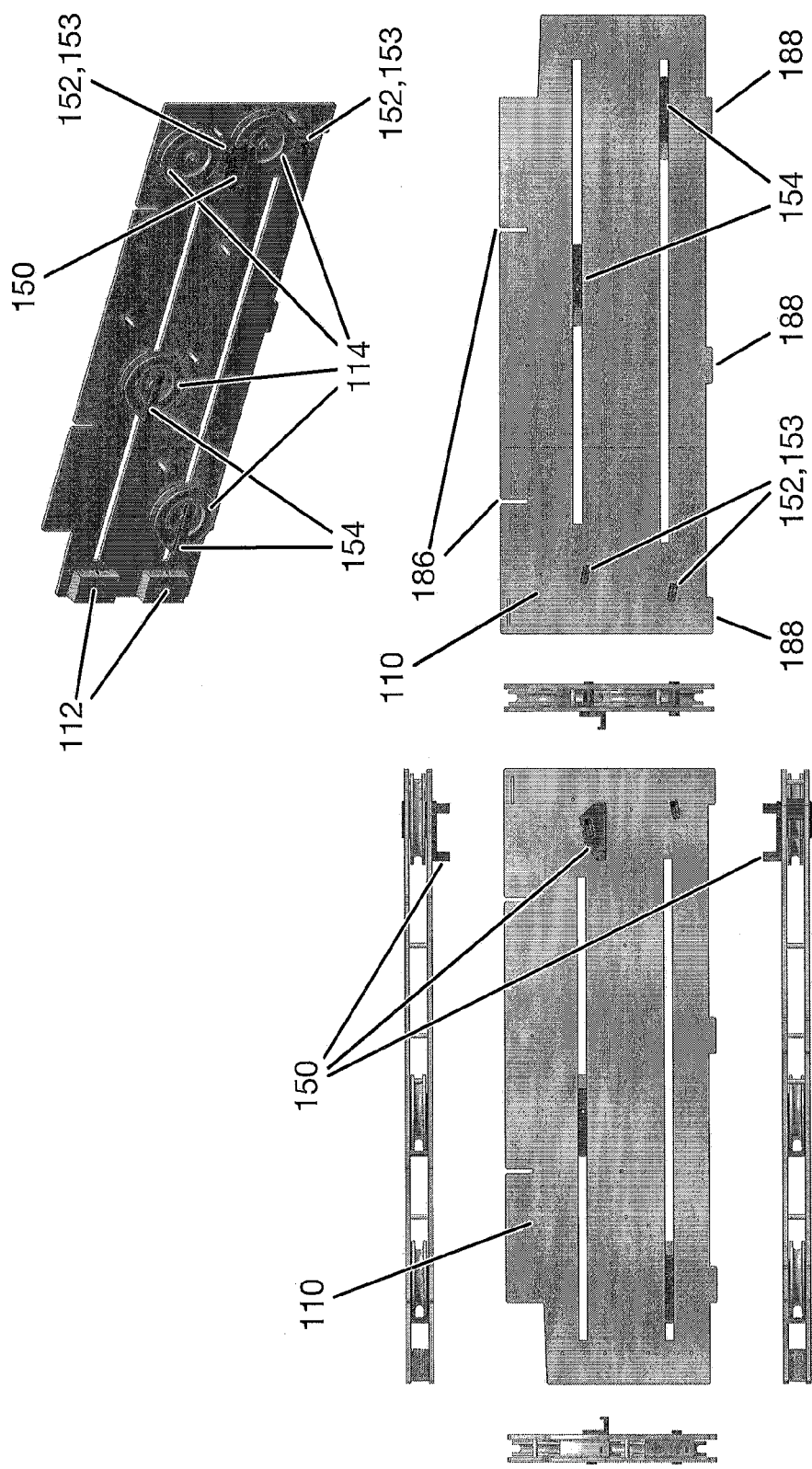
FIG. 34—Orthographic and trimetric views of a cable retractor, shown as a dual-cable retractor mechanism.
Figure 35:
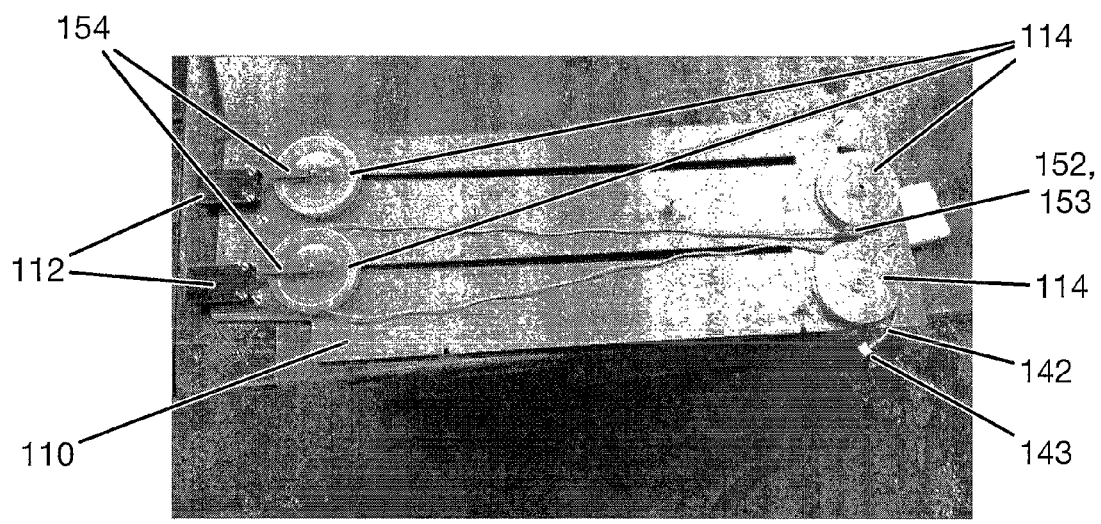
FIG. 35—Perspective view of a partially assembled cable retractor mechanism, with one side panel, pulleys, 3D-printed plastic pieces, hardware and one power adapter cable installed.
Figure 36:
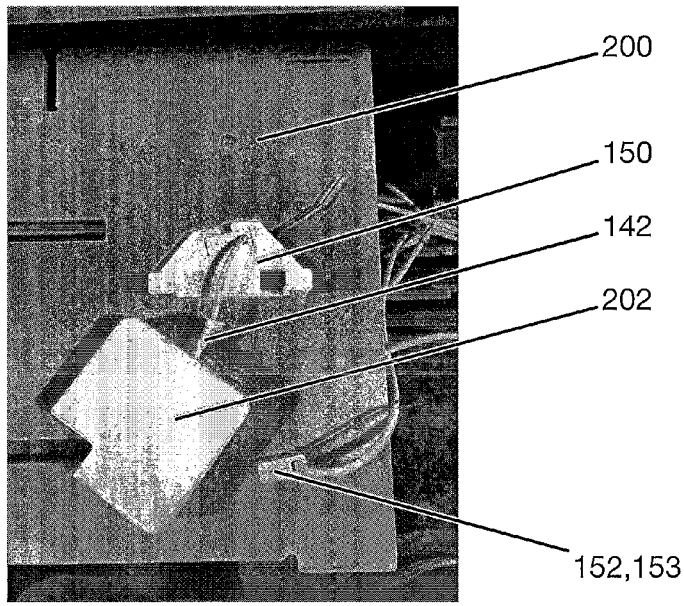
FIG. 36—Perspective view of cable retractor mechanism with a power adapter installed, lying next to support bracket.
Figure 37:
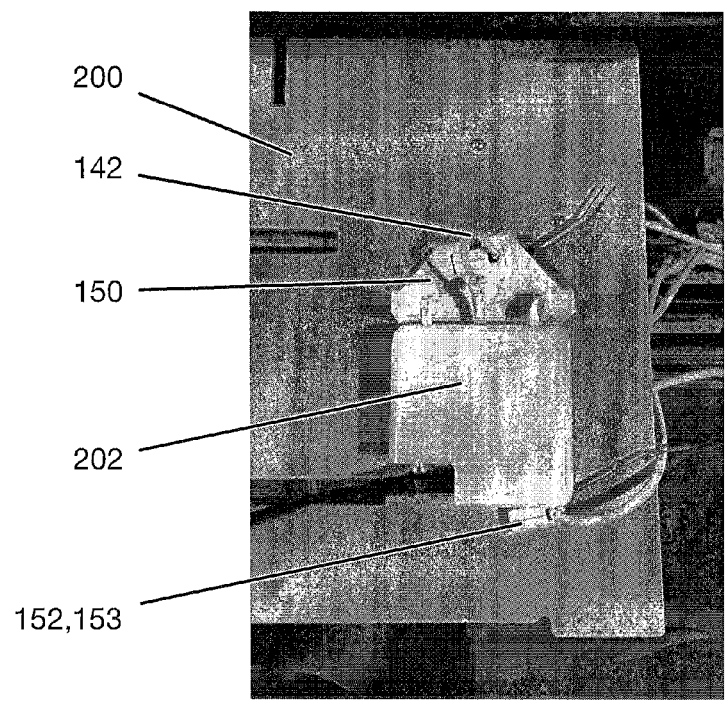
FIG. 37—Perspective view of cable retractor mechanism with a power adapter hanging on support bracket with power cord plugged into it.
Figure 38:
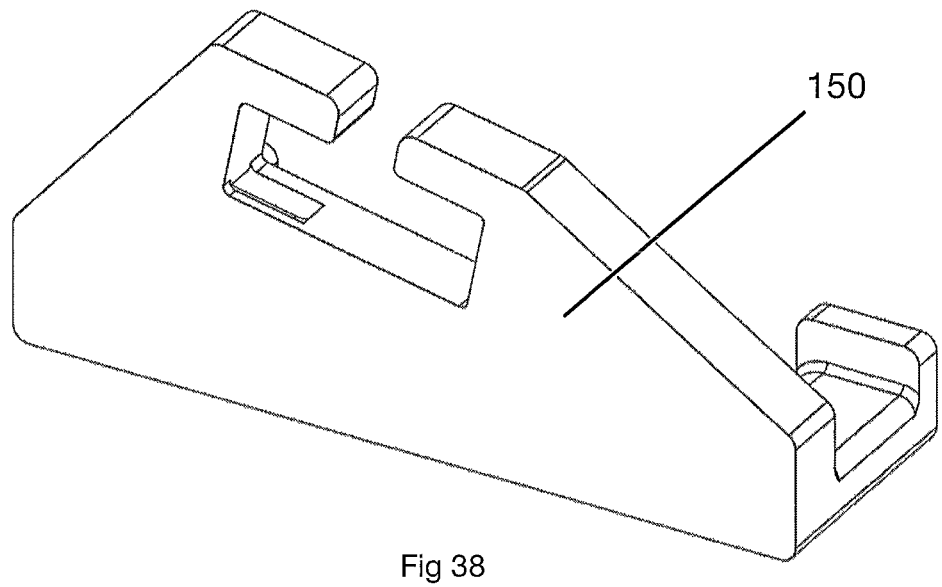
FIG. 38—Oblique view of back side of power adaptor hanger.
Figure 39:
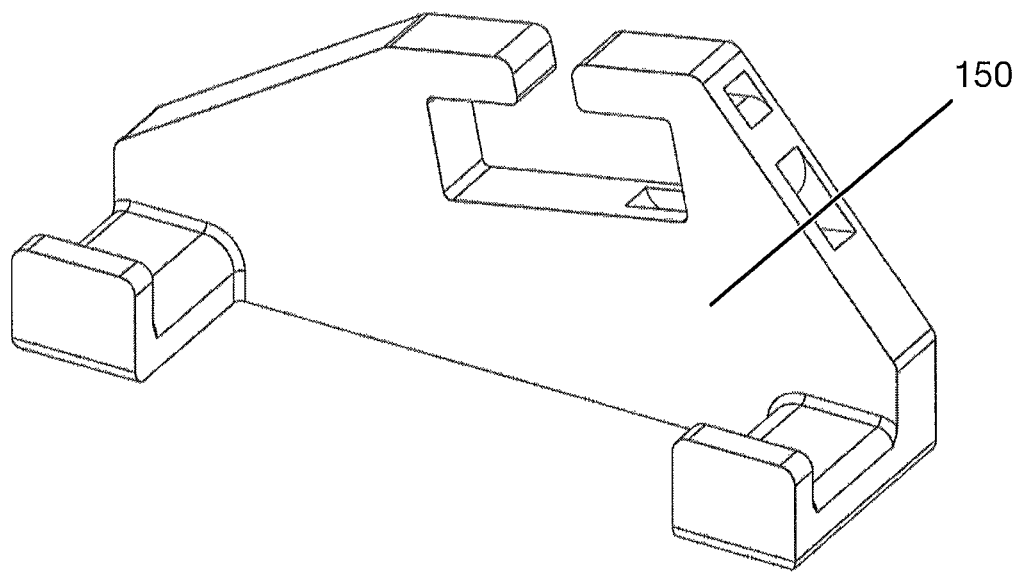
FIG. 39—Oblique view of front side of power adaptor hanger.
Figure 40:
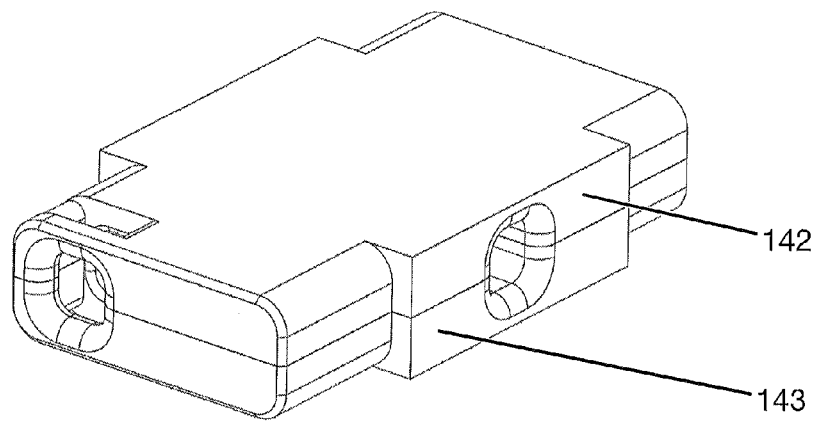
FIG. 40—Oblique view of assembled cable strain relief.
Figure 41:
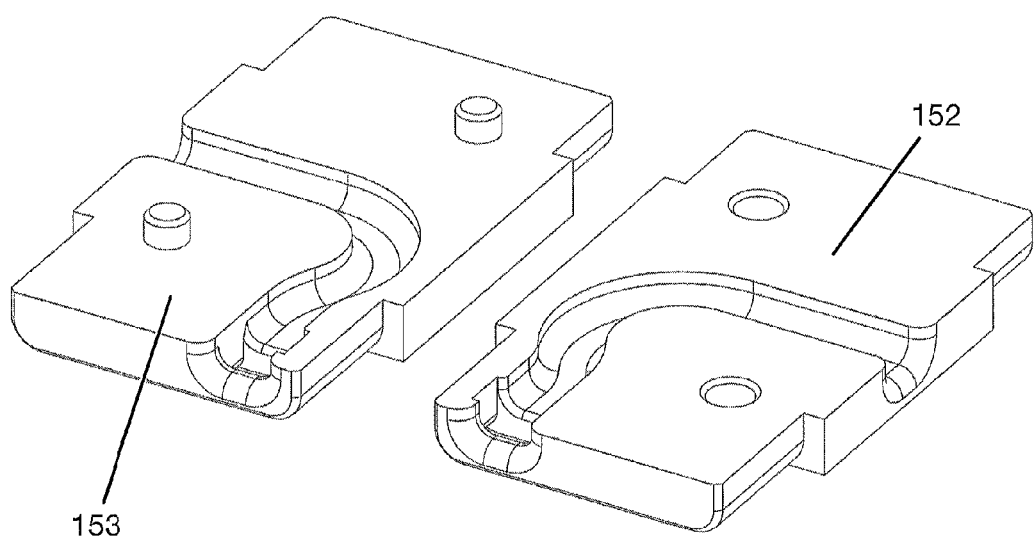
FIG. 41—Oblique view of cable strain relief parts.
Figure 42:
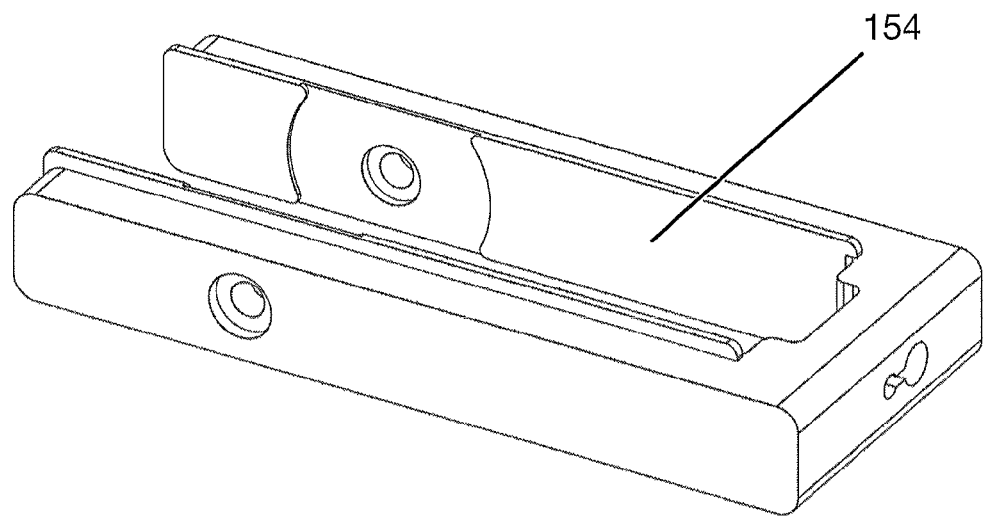
FIG. 42—Oblique view of cable pulley bracket.
Figure 43:
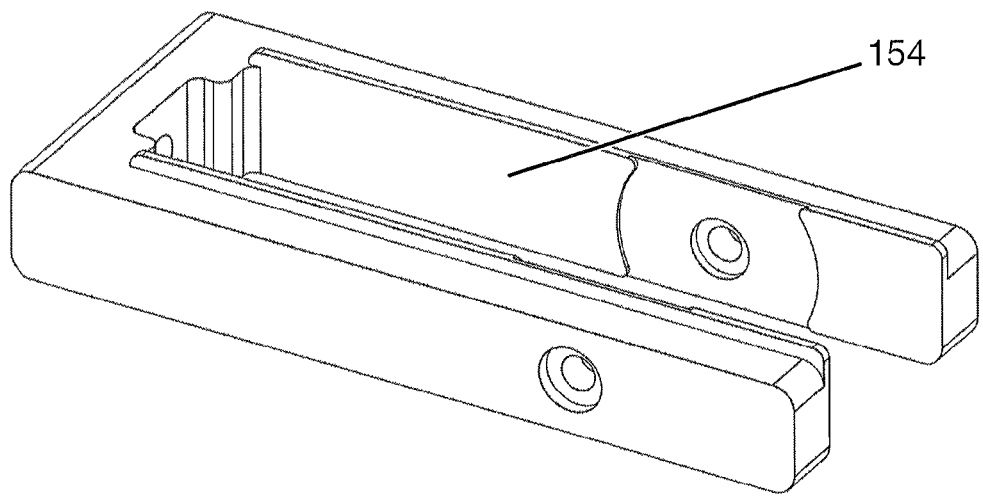
FIG. 43—Oblique view of cable pulley bracket.
Figure 44:
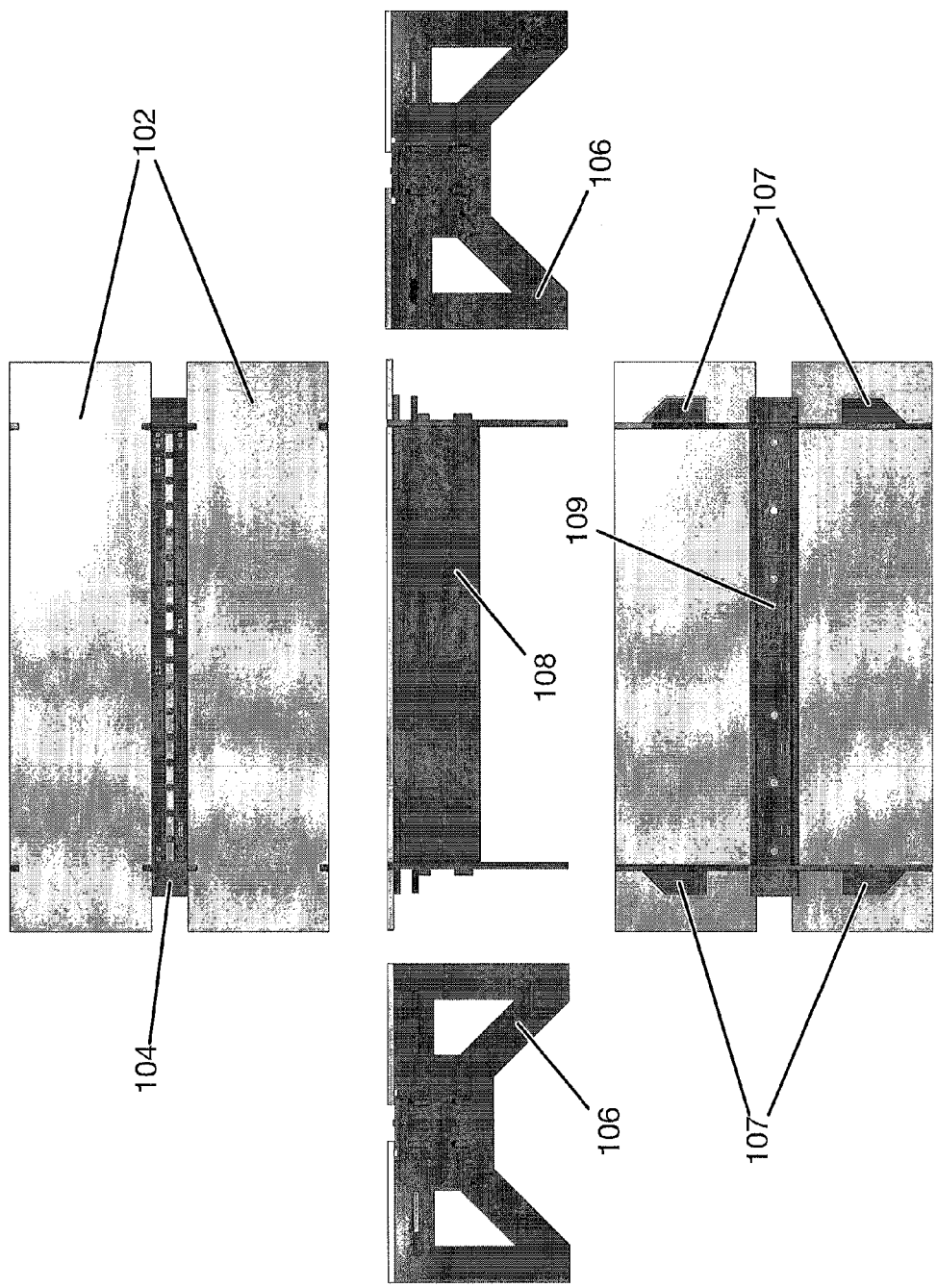
FIG. 44—Orthographic views of assembled table.

Using an insulation-displacement power receptacle 164 in the housings 160,162 results in positioning the internal wiring close to the parting line between the two housings 160,162, as can be seen in FIG. 22 and FIG. 23. This positioning keeps the electrical conductors suspended in air instead of lying along a bottom surface which has the benefit of keeping the conductors above any spilled liquids that may enter the power strip housing and pool on the bottom surface before draining. This can prevent electrical coupling of the housing to the conductors by the conductivity of the spilled liquid. Only the ground wire is in proximity to and in contact with the housing, and it poses no danger because it is already electrically coupled to the housing.

A single double-sided power strip 204 may provide outlets on both the upper and lower surfaces, but multiple power strips may still be required to accommodate the table's layout. For example, if an alternate table design incorporates a divider down the middle to provide privacy between each half of the table, a separate power strip would be required for each side to provide outlets on upper surfaces for each half of the table.

Outlets on upper and lower table surfaces can alternately be provided by two or more single-sided power strips that are oriented with outlets on the upper surfaces and outlets on the lower surfaces. This has several benefits. Using separate single-sided power strips allows the use of readily available off-the-shelf products. Also, using separate single-sided power strips allows more design flexibility. The locations of upper surface outlets and lower surface outlets are not coupled together so the power strips can be placed in unrelated locations. In addition, the quantity of power strips can be different above the table than below or within it. For example, if an alternate table design incorporates a divider down the middle to provide privacy between sides, a separate power strip might be required to provide upper outlets for each side while a single power strip may be sufficient to provide lower outlets within or under the table.

The desire to have a table design with a narrow center panel 104 between the table tops 102 influenced the packaging of the cable retractor mechanisms and power strip in such a way that providing power on the bottom side of the center panel has several benefits. Power cords can hang from the strip, allowing some of their excess length to be taken up by the path down from the power strip to the location where they enter the cable retractor, instead of the entirety of any excess cord being wadded, coiled or folded up in the bottom of the center space, potentially interfering with a cable retractor by protruding into a take-up pulley bracket track or by putting pressure on a cable retractor panel and causing deflection which then causes excess friction on an internal component. Because positioning the cable retractors close together can limit the amount of room available for a user's hand and arm to reach the bottom of the center space, locating a power strip at the bottom of this space would hinder maintainability by making it difficult to reach the bottom and manipulate a cord plug to plug it into a power receptacle. By locating the power strip at the top of the space and hanging the cords, the end of the cords affixed to the retractors can be lowered into the storage space along with the retractors as they are installed vertically, while the other ends of the cords can be left dangling out of the center space to be subsequently plugged into the power strip which is then lowered down onto the storage space. This assembly order is elegant and very easy for a user, improving maintainability.

A double-sided power strip 204 can be produced with a single power cord 166 that powers all of the upper and lower sockets/outlets/receptacles. One advantage is that a single cord only occupies one wall or floor power receptacle, leaving other any other wall or floor power receptacles open for other devices. Another advantage is that a single power cord helps minimize the number of wires inside the table. Another advantage is that s single cord minimizes what needs to be concealed outside of the table to prevent users from catching it with their legs or feet or tripping over it. Another advantage is that s single cord is easier to conceal than multiple cords and it makes the workspace more aesthetically pleasing. It minimizes visual clutter that deters from the overall appearance and aesthetics of the table.

Figure 52:
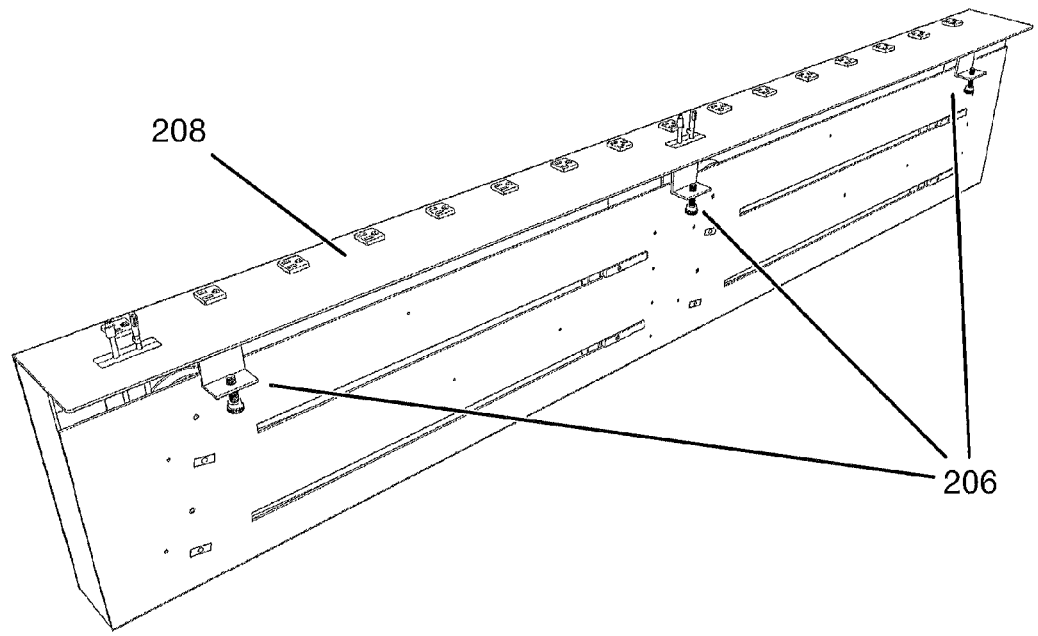
FIG. 52—Perspective view of accessory power unit, shown with attachment clamps for attaching to a table.

If the center panel 104 or housing for an accessory power unit 208 is produced using sheet metal or a suitably thin material, it is possible to integrate the power receptacles 164 directly into the panel or housing as shown in FIG. 52. This can serve to eliminate the upper housing of the power strip and make the result more aesthetically pleasing by eliminating gaps and joints that would be present with a separate power strip mounted into the panel or housing.

Cable Retractor

In one particular version of the invention, the cable retractor assembly 200 is designed to store two retracted cables 144 in a narrow vertical space and to be easy to manufacture with common shop equipment and inexpensive 3D printed plastic parts.

The retractor is designed to be easy to manufacture, utilizing mostly off-the-shelf parts plus a few custom pieces that can easily be manufactured using CNC machining and rapid prototyping methods such as fused deposition modeling (FDM) or fused filament fabrication (FFF). No custom injection molded plastic parts are strictly necessary. The construction is basically two parallel plates that support one or more moving pulleys that take up excess cord by routing the cord along a "U" shaped path that reduces the storage length to approximately one half of the cord's extension length.

Two parallel panels 110 provide two channels to support a cable pulley 114 and bracket 154 and keep the pulley 114 properly oriented to prevent any tangling of the cable 142 as the pulley 114 moves to take up or supply additional cable. This design is a simple one that minimizes friction because the forces on the pulley are kept balanced and optimally directed. The cable strain relief 152,153 and the direction-change pulley direct the cable around the take-up pulley in a balanced geometry, and the pulley bracket 154 is pulled from the opposite side of the take-up pulley to properly balance the forces. This effectively eliminates torque on the axle of the take-up pulley that could otherwise require a linear bearing or other lubricated friction surface to keep the take-up pulley properly aligned. In essence; the take-up pulley bracket "floats" within the two channels of the side panels 110, only requiring minimal alignment due to gravity acting on the components and any kinks or bends in the cable itself.

The cable strain relief routes the cable 142 into the cable retractor and bends the cable so that it is properly aligned with the take-up pulley. It is designed in two halves 152 and 153 to allow off-the-shelf cables with large connectors 143 to be used within the cable retractor, eliminating the need to manufacture a cable strain relief around the cable 142 or to terminate the cable with a connector 143 after being inserted through a cable strain relief. The hole in the side panel 110 can be made large enough to accommodate the diameter of the cable 142 and the dimensions of the cable connector 143, and the cable strain relief halves 152 and 153 can be made the correct size to securely hold the cable 142 within the opening in the side panel 110. The cable connector 143 can be routed through the opening in the side panel 110, and the two cable strain relief halves 152 and 153 can be brought together around the cable and then inserted into the opening in the side panel 110 to hold the cable strain relief in place.

The cable retractor mechanism 200 can accommodate a wide range of prefabricated power adapter and/or data cables/cords with a wide range of sheath thicknesses and connectors. In most applications, there is no need to design and manufacture custom cables for the retractor mechanism because the design of the mechanism allows many standard connectors to be routed into, through and out of the retractor mechanism without requiring custom cables with unique requirements or cable connectors to be attached to wiring by soldering or crimping after the retractor is assembled because of size restrictions of cable passages or orifice(s).

Cables and power adapters may be integrated or separable. For example, APPLE MACBOOK MAGSAFE chargers have an integrated cable that cannot be removed from the power adapter. Apple Lightning cables, however, have a male USB connector on the opposite end and are designed to be used with a separate power adapter with a female USB connector into which the USB end of the Lightning cable is plugged. The cable retraction mechanism 200 can utilize either kind of cable and power adapter. The power strip 204 allows small power adapters with fixed or flip-out prongs to be plugged directly into the power strip, and then separate cables can be plugged into the small power adapters and routed into the cable retractor mechanisms 200. Power adapters like the Apple MacBook charger may have a power cord that can be plugged directly into the power strip 204.

The retractor mechanism 200 may be scaled to a shorter or longer length to accommodate cables of various lengths.

The design minimizes the number of pulleys 114 to reduce cost and complexity, to reduce the frictional forces incurred by bearing surfaces, and to minimize the bending forces on the wire conductors in the cables.

The cable retractor utilizes large diameter pulleys 114 in order to minimize the bending of the internal wire conductors thereby maximizing the service life of the cables.

If required, the diameter of the pulleys 114 may be reduced to allow packaging the retractor mechanism 200 into a smaller space. While a larger diameter pulley is preferable for maximizing the service life of the cables, some cables may tolerate a smaller bending diameter and can therefore be used with smaller diameter pulleys, allowing a smaller retractor design to be packaged into a smaller space. In addition, some applications may require the cable retractor to be packaged into a smaller space or volume whether or not it compromises the service life of the cables, so smaller diameter pulleys may be required.

Cable retraction force can be adjusted by changing the pull strength of the pull-box 112. These pull-boxes are typically spring biased and available in a range of tension forces and a range of cable extension lengths, accommodating a wide range of cable retractor design requirements. They are commercially available and commonly referred to as a security tether mechanism, a recoiler, or cable retractors. It should be understood that a wide variety of recoil mechanisms may be used with cable retractor mechanism 200, including constant force, constant tension, or other types of springs.

A ratcheting mechanism may be used in the pull-box 112 to prevent the cord 142 from retracting until it is manually released by the user. This allows a user to pull the cable 144 out to a desired length, and the cable will remain withdrawn at that length without retracting. When the user is ready to retract the cable 144, a short tug on the cable will cause the ratchet mechanism to release, causing the cord 142 to then retract back into the retractor mechanism 200.

An alternate means to prevent the cord 142 from retracting would be to provide a cable locking mechanism separate from the pull-box, such as an eccentric cam. In operation, the eccentric cam would pivot away from the cable as the user pulls the cable, allowing the cable to be freely withdrawn from the cable retractor. When the user released tension on the cable, the eccentric cam would wedge the cable against a stationary surface to prevent the cable from retracting. When the user wished to retract the cable, the eccentric cam could be released with a mechanical release mechanism, allowing the cable to retract into the retractor mechanism.

The retractor mechanism can be manufactured as a single cable mechanism or a multiple-cable mechanism. In a particular version of the invention, the retractor mechanism is a dual-cable (two cable) mechanism where the take-up pulleys and direction-change pulleys for each cable are stacked one above the other, allowing the cable connectors to exit the table adjacent to one another to minimize the width of the table's center panel. The direction-change pulleys are staggered horizontally to allow the cables to exit the retractor along substantially parallel paths, the two exit paths being a small distance apart to position the cable connectors far enough apart to be easy to grasp individually by hand but close enough together to be aesthetically pleasing. This cable retractor design achieves this positioning without requiring any additional pulleys to change the direction of the cables that might be required by some other cable retractor design or layout.

The physical layout and design of a retractor can take advantage of the linear length of the table to "take-up" the length of the cable horizontally. Because most sitting desks have a height in the range of 27 to 30 inches from the floor to the top of the work surface, this height limits the amount of cable that can be taken up with a "U" shaped path around one pulley moving along a vertical path. This vertical distance may not provide the cable extension distance required by the user, so the cable retractor mechanism may be turned horizontally to provide a longer extension distance governed now by the linear length of the table. However, The mechanism could be oriented vertically and the direction-change pulley could be eliminated if the table design has sufficient height to allow it. For example, a standing desk would have sufficient height to allow a cable retractor to be oriented vertically so that the take-up pulley and bracket moves vertically and the cable exits the retractor vertically, and it would also eliminate the need for an additional direction-change pulley.

The retractor design allows one end of the cable to remain stationary, allowing any connector or power adapter on the stationary end to also remain stationary which eliminates a point of movement or bending that could result in a failure that shortens the service life of the cable. Basically in this design, one pulley moves and the cable bends around it.

In a particular version of the invention, the cable retractors are positioned in such a way as to allow space for excess cord to be coiled up and stored between the retractors and below the power strip. Power cords and data cables may have excess length that needs to be coiled up and stored, and the presence of a plate on the cable retractor toward the center of this space helps prevent any excess power cord or data cable from interfering with the operation of the cable retractor mechanism. While an additional shield may be applied to the retractor mechanism to prevent all interference, if the excess cord is neatly coiled and tie-wrapped or loomed, there are no protrusions small enough to enter the track for the take-up pulley bracket and interfere with its movement.

The cable retractor mechanism is designed to be user serviceable. Unlike some sheet metal enclosures and injection molded plastic housings that may require a complicated sequence to open, this retractor mechanism is more open and obscures less of the internal workings, allowing a user to more easily spot a problem and operate on the mechanism.

In one particular version of the invention, the retractor mechanism is removable, allowing a user to remove a mechanism for repair without affecting the operation of any remaining retractors in the table.

In one particular version of the invention, the bottom panel 109 and the placement of two or more retractors 200 forms a space enclosed on three sides. The bottom panel 109 and/or the retractor side panels 110 may be manufactured from a fire resistant material such as fire resistant MDF (medium density fiberboard), aluminum, steel or other suitably strong fire resistant material, to provide protection against electrical shorts or other sources of flame. The space provides room for maintainability, allowing a user to insert a hand and arm between the retractors 200 to access cord and cables. The space provides cooling air for power adapters 202 that are stored within the space, minimizing the chance of an adapter overheating and becoming a possible source of ignition. The placement of a power strip 204 above and between the retractors 200 encloses the top of the space with another potentially flame resistant surface, that surface being the lower housing of the power strip.

The table bottom panel 109 and the retractor locators 126 reduce the complexity of the cable retractor assembly 200 by providing a spacing means for the retractor side panels 110, eliminating some of the spacers required to keep the retractor side panels 110 spaced apart properly. The slots 182 in the bottom panel 109 accurately space apart the lower edges of the retractor side panels 110, eliminating the need for spacers along the bottom of the retractor assembly 200. The upper retractor locators 126 accurately space apart the upper edges of the retractor side panels 110, eliminating the need for spacers along the top of the retractor assembly 200.

Cables need not retract fully into the retractor. Because of the orientation of the cables exiting the table, the retractor can be adjusted so that the tension is released before the connector 143 hits the grommet 134 to prevent the tension from straining the connector 143 and causing damage to the cable 142. Gravity then causes the cable 142 to sink lower, putting the connector 143 flush with the grommet 134 for a nice clean appearance. This eliminates the need to attach any kind of strain relief mechanism to the cord just behind the connector 143 to take any strain off of the connector 143 as it impacts the grommet 134. A strain relief would be a cosmetic blemish that would be visible on the cable 142 and that would cause the cable 142 and connector 143 to protrude father from the grommet 134 and table's surface. Instead, the grommet 134 hole can be made small to prevent the connector 143 from falling through, and the connector 143 can be the only visible item protruding from the table. Without an additional strain relief mechanism, the connector 143 can sit flush with the top surface of the grommet 134.

The cable grommet 134 can be made in two halves 132 to allow one or more cables 144 to be installed into the grommet 134, eliminating the need to manufacture the grommet around the cables or to manufacture the cables within the grommet 134. By making the grommet in two halves 132, the two halves can be brought together around the cable and then fastened together or inserted into a recess in the table to hold the grommet 134 in place. The advantage is that the cord does not need to be terminated after being inserted through the grommet, or if the cord is already terminated and the grommet hole made large enough to accommodate the cable connector 143, the cable would require a strain relief mechanism to be attached to prevent the connector 143 from passing back through the grommet.

Concealed Adapters and Cables

Figure 46:
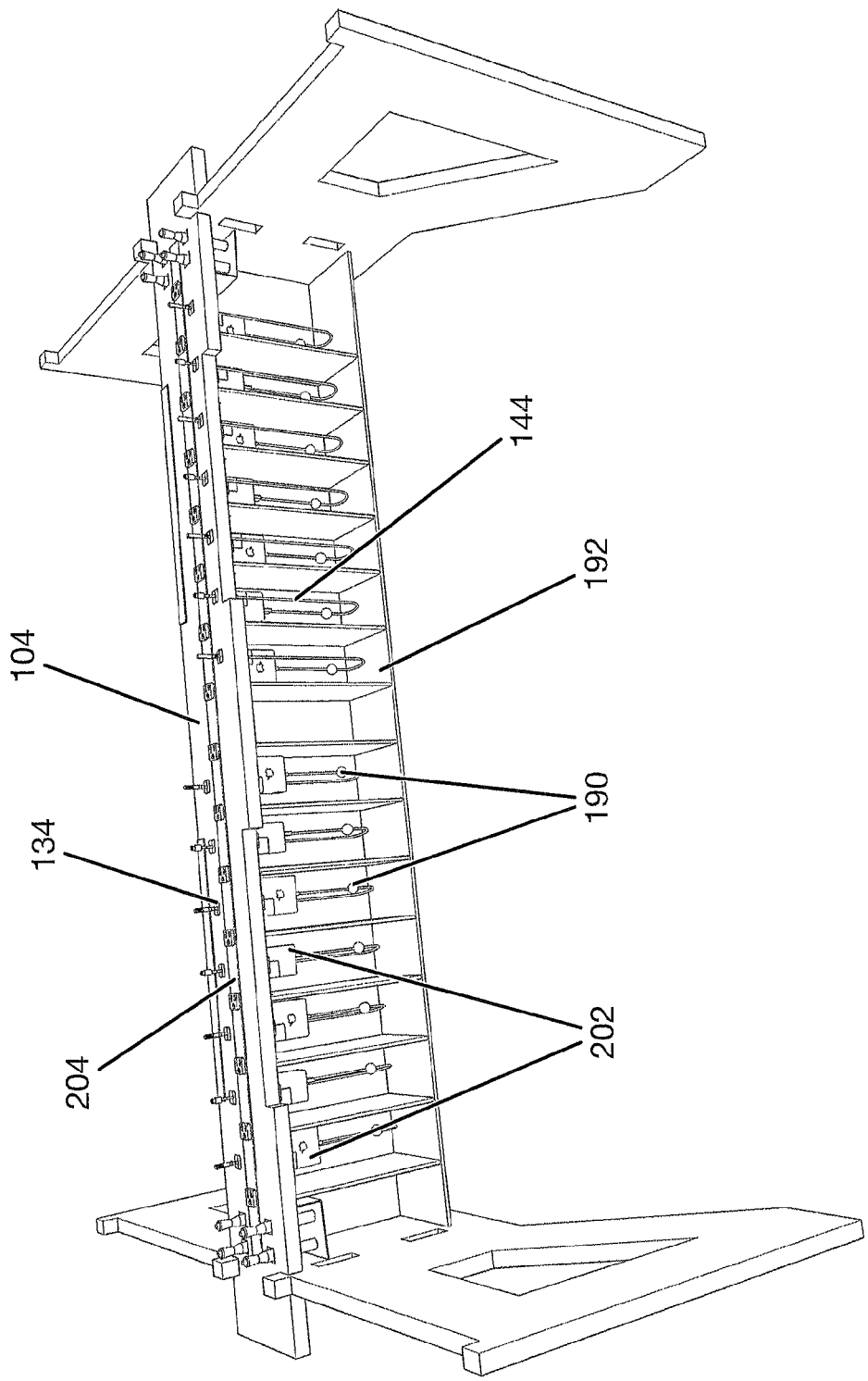
FIG. 46—Perspective view with both top panels and one stretcher panel removed to show concealed power adapters and cables.
Figure 47:
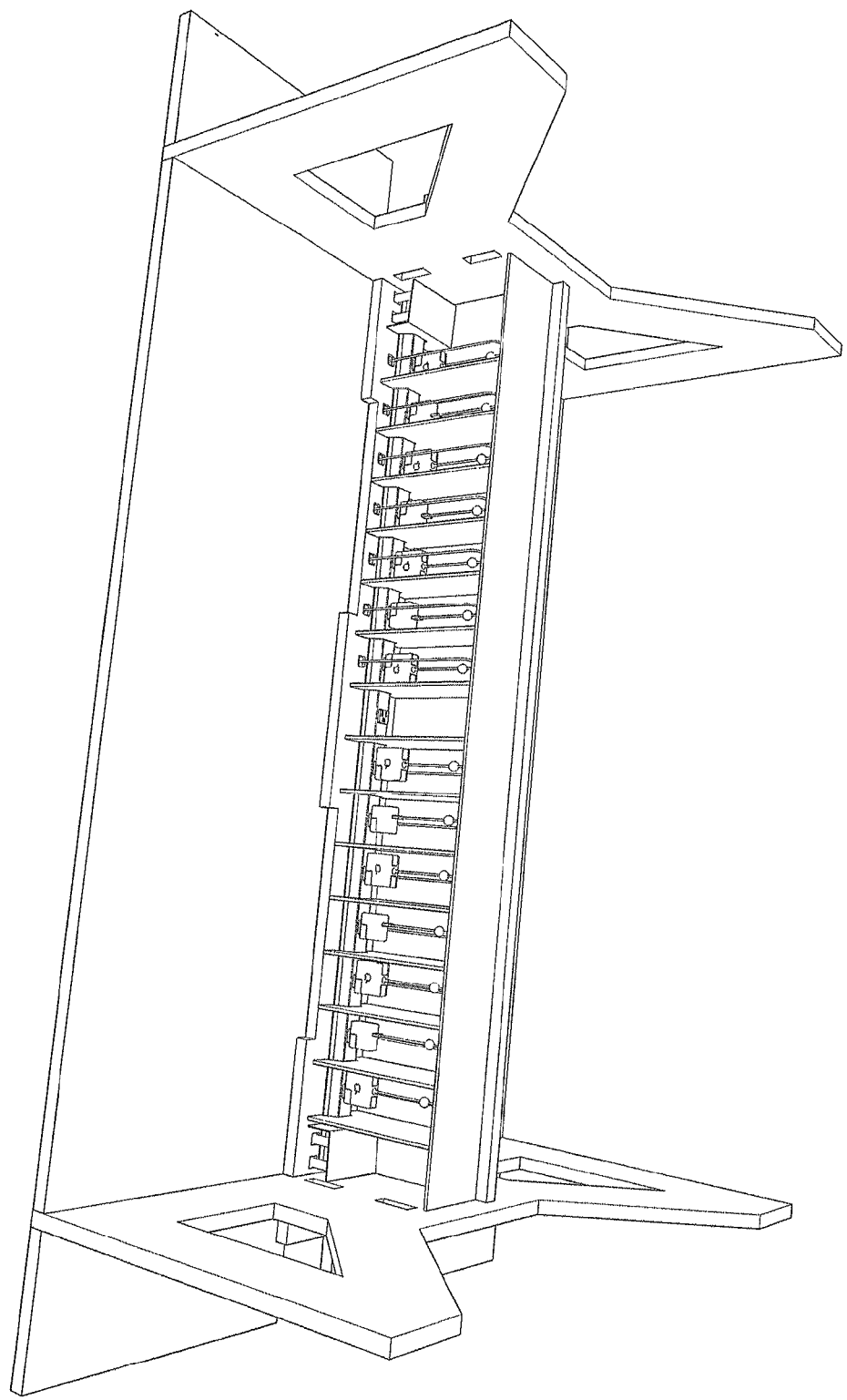
FIG. 47—Perspective view from underneath table with both top panels and one stretcher panel removed to show concealed power adapters and cables.
Figure 48:
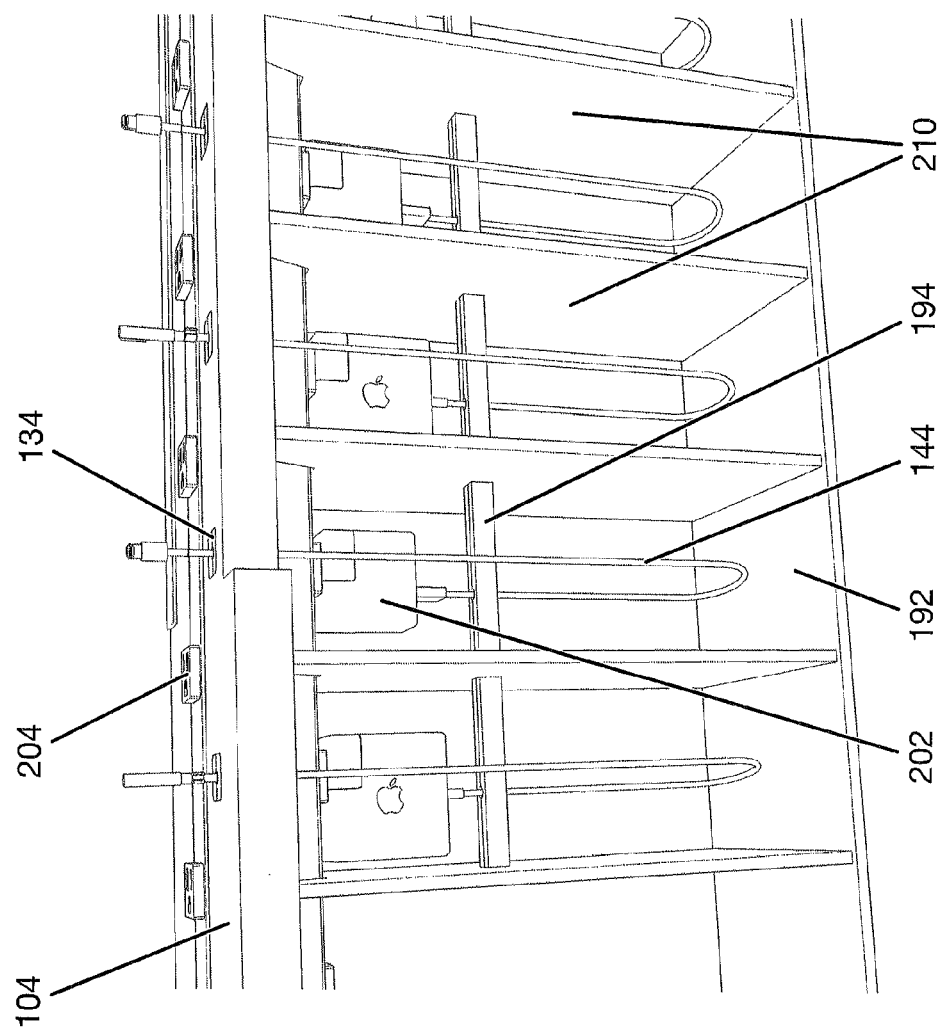
FIG. 48—Perspective view of chamber showing alternate cable strain relief mechanism.

In one particular version of the invention, power adapters 202 and cables 144 are concealed within individual chambers 192 that each house a single cable 144 and optional power adapter 202 as shown in FIG. 46 through FIG. 48. The chamber 192 has a grommet 134 in the center panel 104 above it through which the cable 144 passes. The cables 144 each have an optional strain relief mechanism to prevent the cable 144 from being pulled too far and dislodging the cable 144 from the power adapter 202 or dislodging the power adapter 202 from the power strip 204.

A user may withdraw a desired length of cable 144 from the chamber 192 for use, and when finished using the cable, the user may manually feed the excess cable back down into the chamber 192 for concealed storage.

This solution is more cost effective than providing cable retraction mechanisms because it eliminates the cost of the more complicated cable retractor mechanism 200. The convenience of a self-retracting cable mechanism 200 is traded for a lower consumer price point.

The optional cable strain relief may be provided by several means. One means for providing a cable strain relief is to affix a collar 190 to the cable 144 that is fixed in position along the cable 144 but that is too large to fit through the cable grommet 134 opening, thereby preventing the cable 144 from being pulled out of the chamber 192 past this collar 190.

Another means for providing a cable strain relief is to affix a rigid member 194 to the chamber 192, and then affix the cable 144 to this rigid member 194 at a point along the cable 144. The cable should be affixed to the rigid member 194 at a point that prevents the cable 144 from being dislodged from the power adapter 202 or the power adapter 202 from being dislodged from the power strip 204 when the cable 144 is withdrawn from the chamber 192 by the user. As the cable 144 is withdrawn from the chamber 192 through the grommet 134, a point will be reached where the cable 144 will go taught at the point where it is affixed to the rigid member 194, thereby preventing the user from dislodging the cable 144 or power adapter 202.

Another means for providing a cable strain relief is to affix a tether between the chamber 192 and a point along the cable 144 to prevent the cable from being pulled too far and dislodging the cable 144 from the power adapter 202 or the power adapter 202 from the power strip 204. The tether should be affixed to a rigid or fixed point in the chamber 192 and to the cable 144 at a fixed position along its length, and the tether should be of a length such that the tether will go taught before the cable 144 is dislodged from the power adapter 202 or the power adapter 202 is dislodged from the power strip 204 when the cable 144 is withdrawn from the chamber 192 by the user.

Concealing power adapters and cables has numerous benefits. One benefit is that it reduces cost and complexity because there are fewer and cheaper parts. Another benefit is that it provides an isolated chamber for each adapter and cable which prevents tangling between multiple cables, prevents an electrical short or fire from affecting neighboring chambers, and the failure of any one cable or power adapter does not affect the others. Another benefit is that it increases flexibility because any variety of adapters and cables can be installed with no requirement to be the same or similar, and cables can vary in length because there is no surrounding retraction mechanism to govern or restrict the length.

Assembly

In one particular tool-free version of the invention, assembly of the table can easily be completed by one person.

First, the end of the first stretcher panel 108 is inserted into the first leg panel 106 and pressed downward to lock it into place.

Second, the end of the second stretcher panel 108 is inserted into the first leg panel 106 and pressed downward to lock it into place.

Third, the two stretcher panels 108 are held roughly parallel to one another, then the bottom panel 109 is slid into the dado grooves 180 in the stretcher panels 108 from the end opposite the assembled leg panel 106.

Fourth, the two stretcher panels 108 are then lifted vertically, inserted into the second leg panel 106 then pressed downward to locked them into place.

Fifth, the cable retractor assemblies 200 are each lowered vertically into the center space until the tabs 188 on the bottom edges of the retractor side panels 110 engage the corresponding slots 182 in the bottom panel 109.

Sixth, the cable retractor locators 126 are then lowered into the slots 186 in the top edges of the retractor side panels 110 to stabilize the retractors laterally.

Seventh, the center panel 104 is rotated on its side and placed into the indentations in the leg panels 106 as shown in FIG. 207 to hold it securely on its side while electrical connections are made and the cables are routed through the cable grommets.

Figure 8:
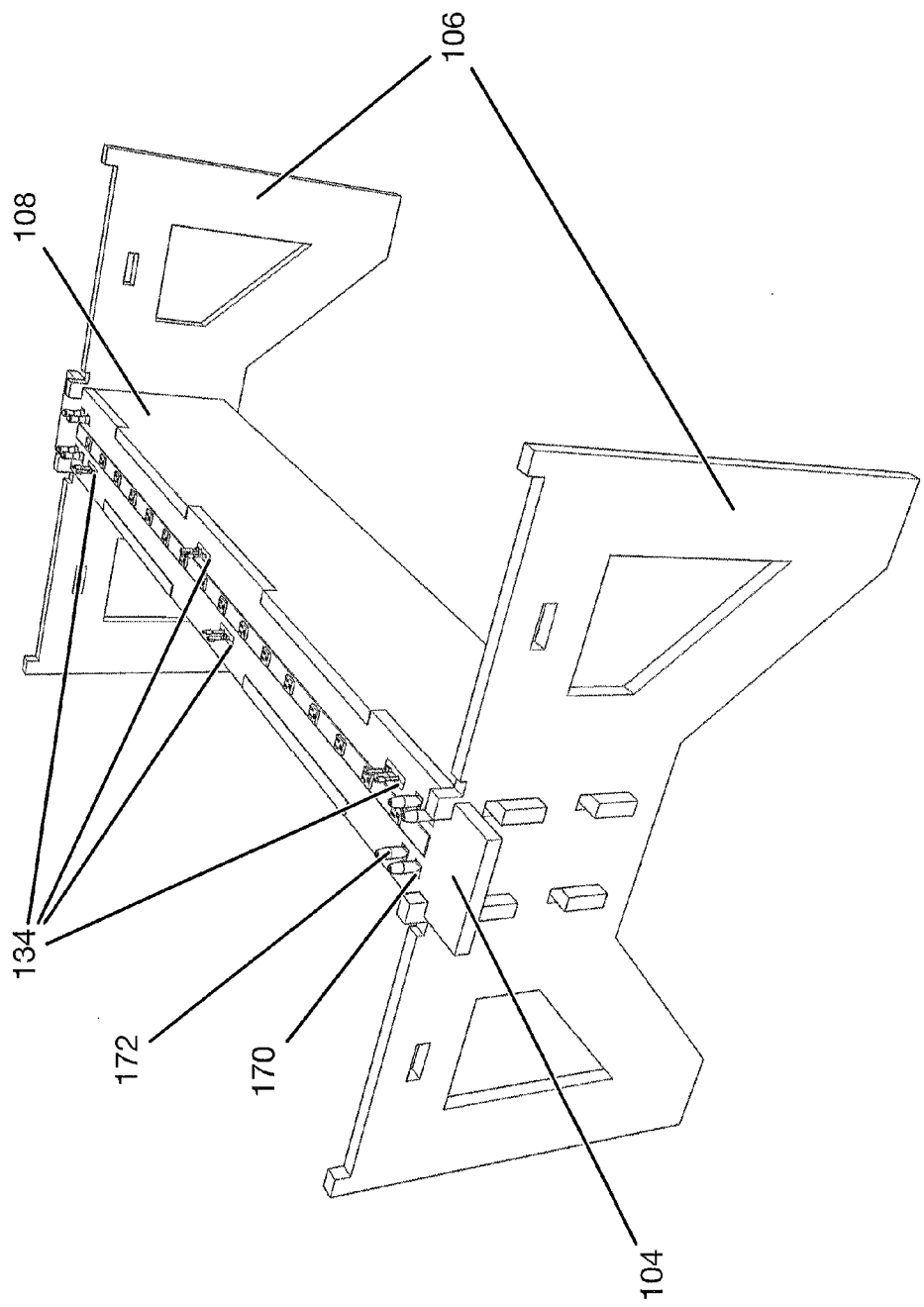
FIG. 8—Perspective view showing a center panel installed on a table frame with cable retractors and dry-erase marker pens present.
Figure 9:
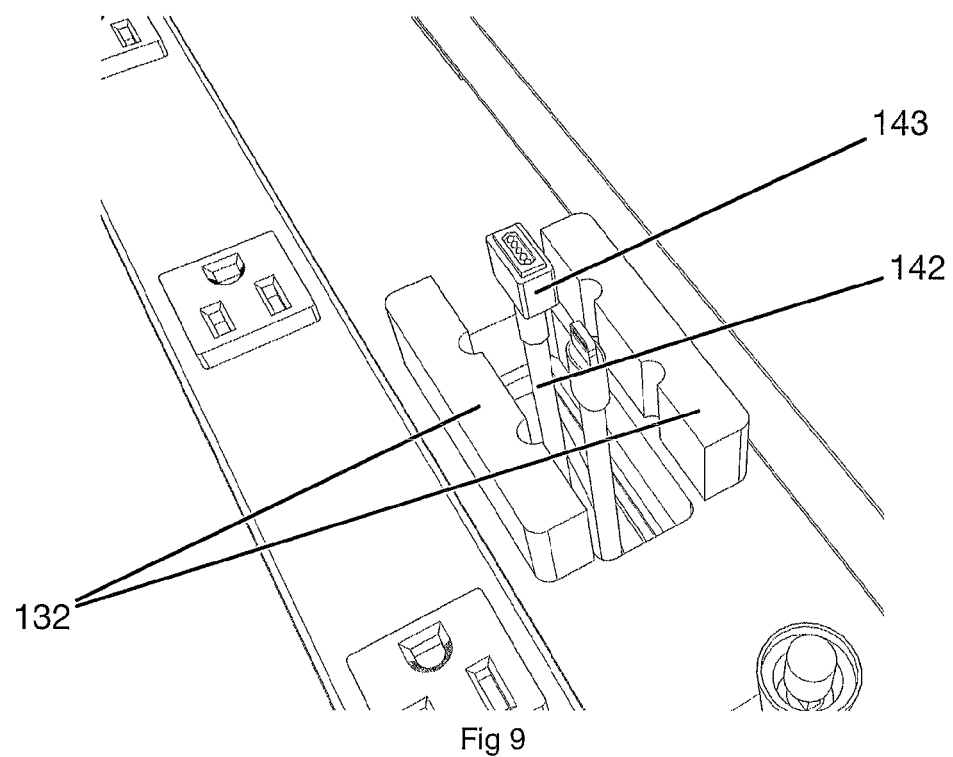
FIG. 9—Perspective view of installation of grommet, with first grommet half seated and second grommet half still protruding from a center panel.
Figure 10:
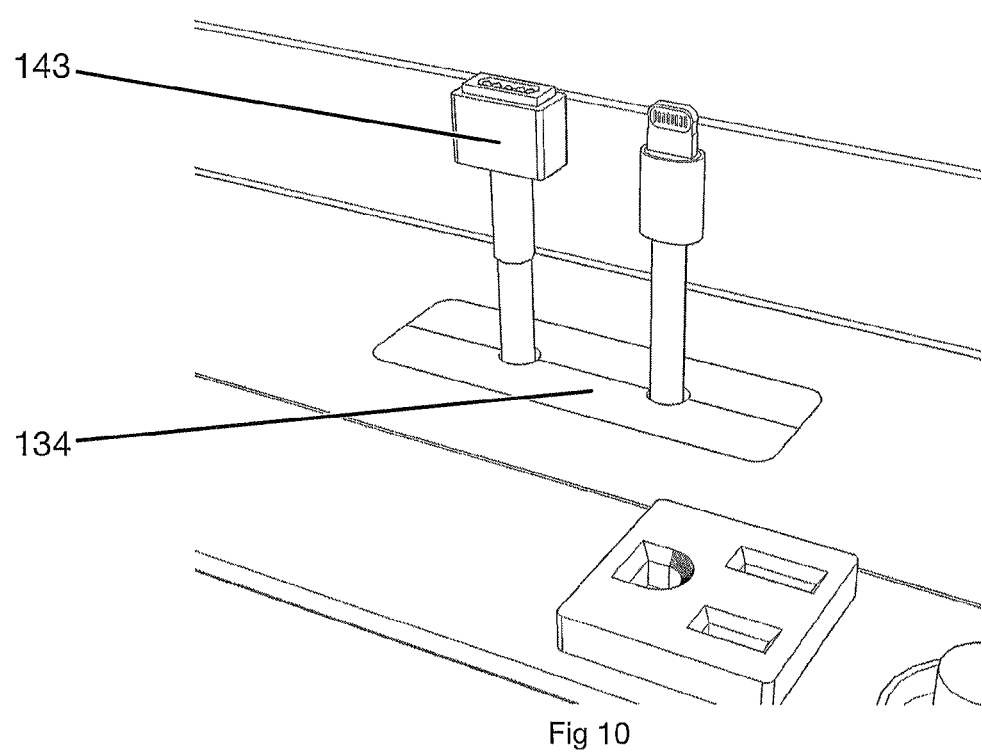
FIG. 10—Perspective view of grommet with both halves fully seated in a center panel.
Figure 11:
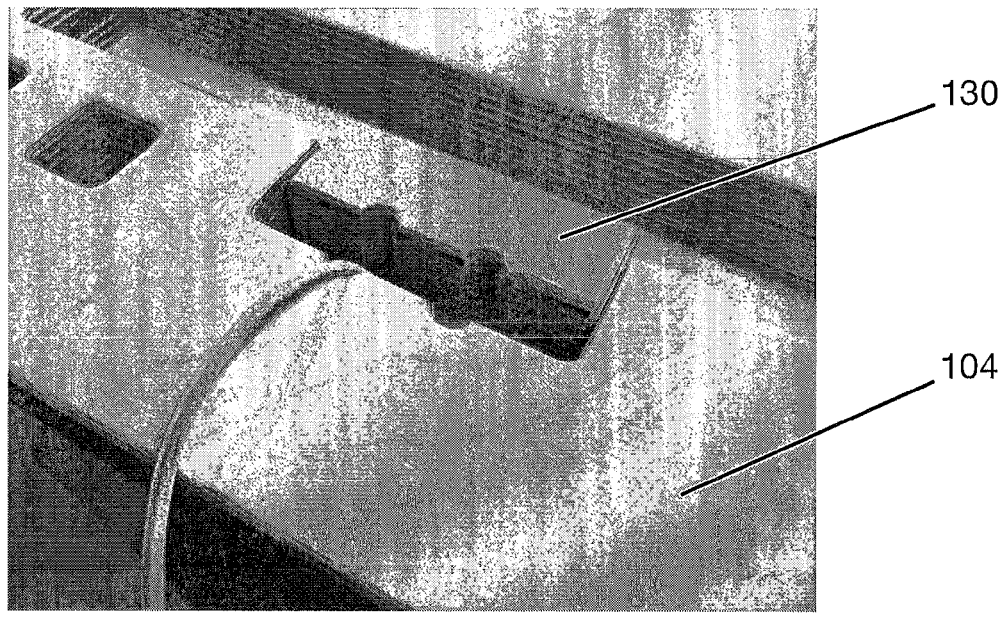
FIG. 11—Perspective view of installation of grommet, shown partially removed from a center panel.
Figure 12:
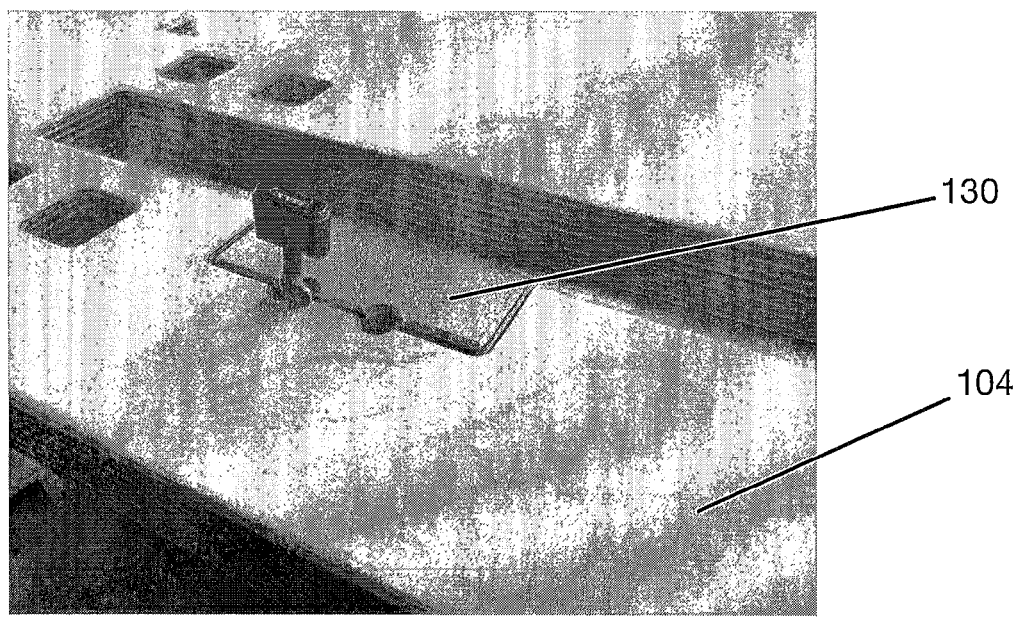
FIG. 12—Perspective view of grommet, shown installed in a center panel.
Figure 13:
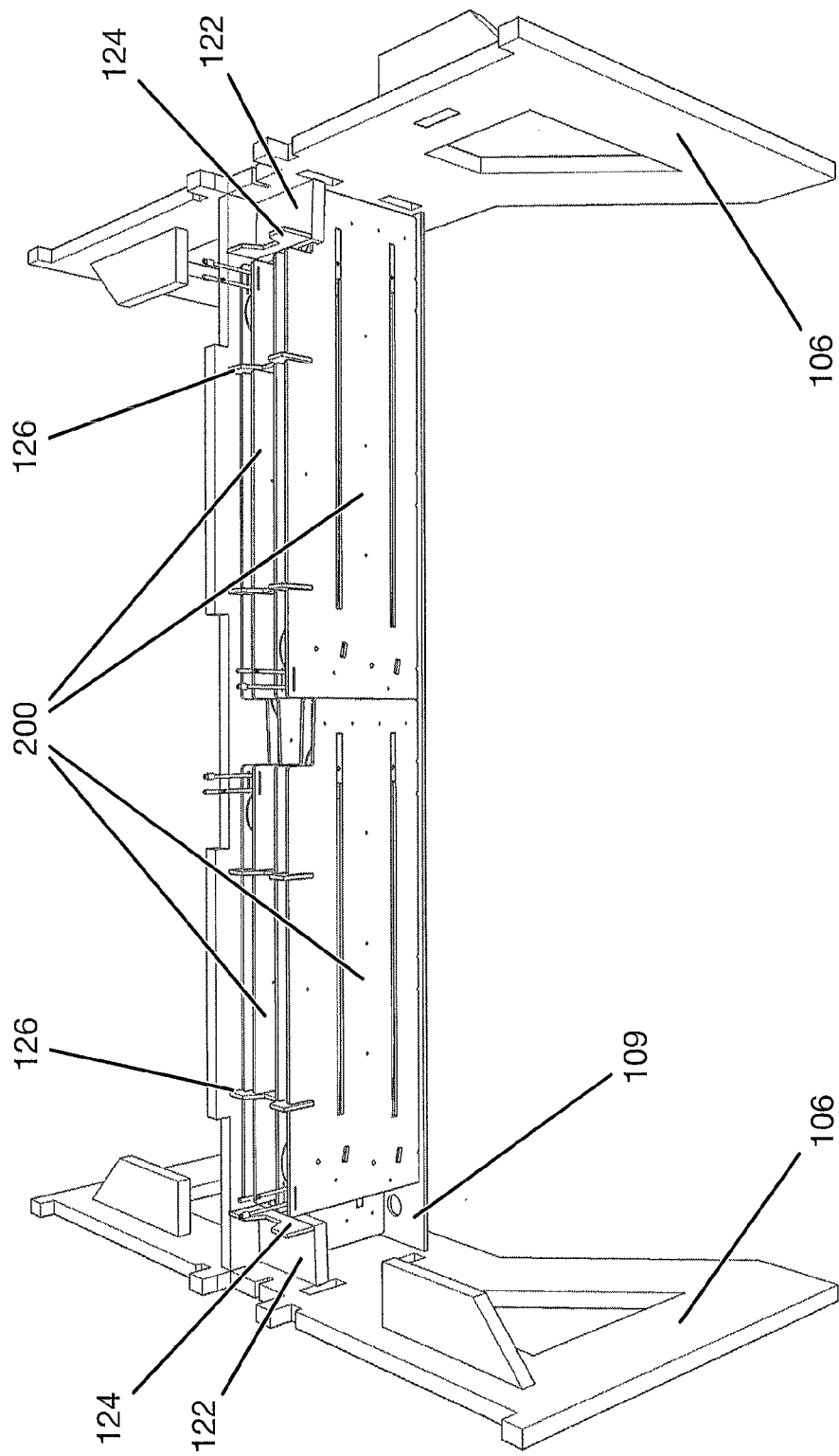
FIG. 13—Perspective view with both top panels, one stretcher panel and the center panel removed to show the layout and packaging of the cable retractor mechanisms. Four cable retractors are shown.
Figure 14:
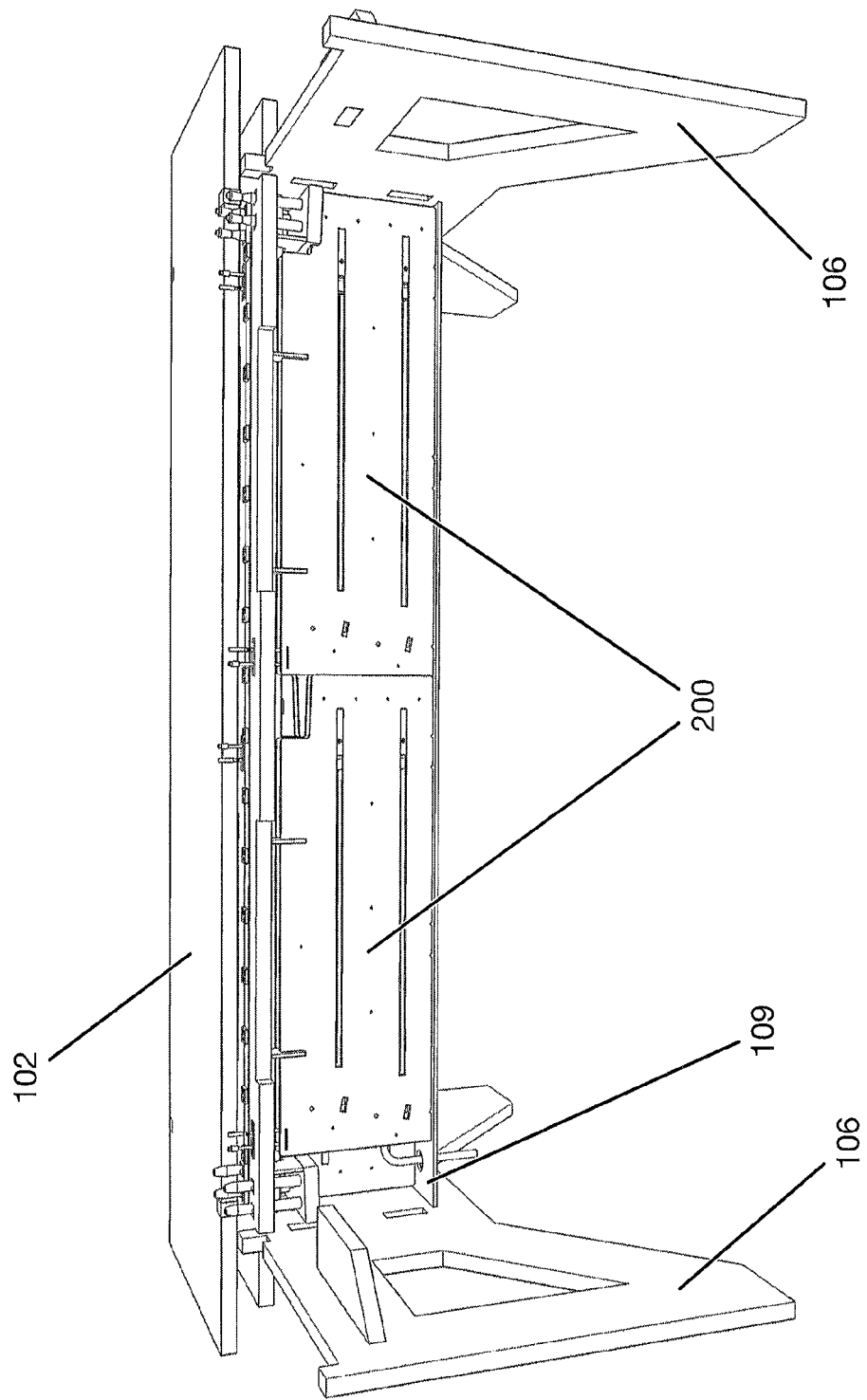
FIG. 14—Perspective view with one top panel and one stretcher panel removed to show the layout and packaging of the cable retractor mechanisms. Four cable retractors are shown.
Figure 15:
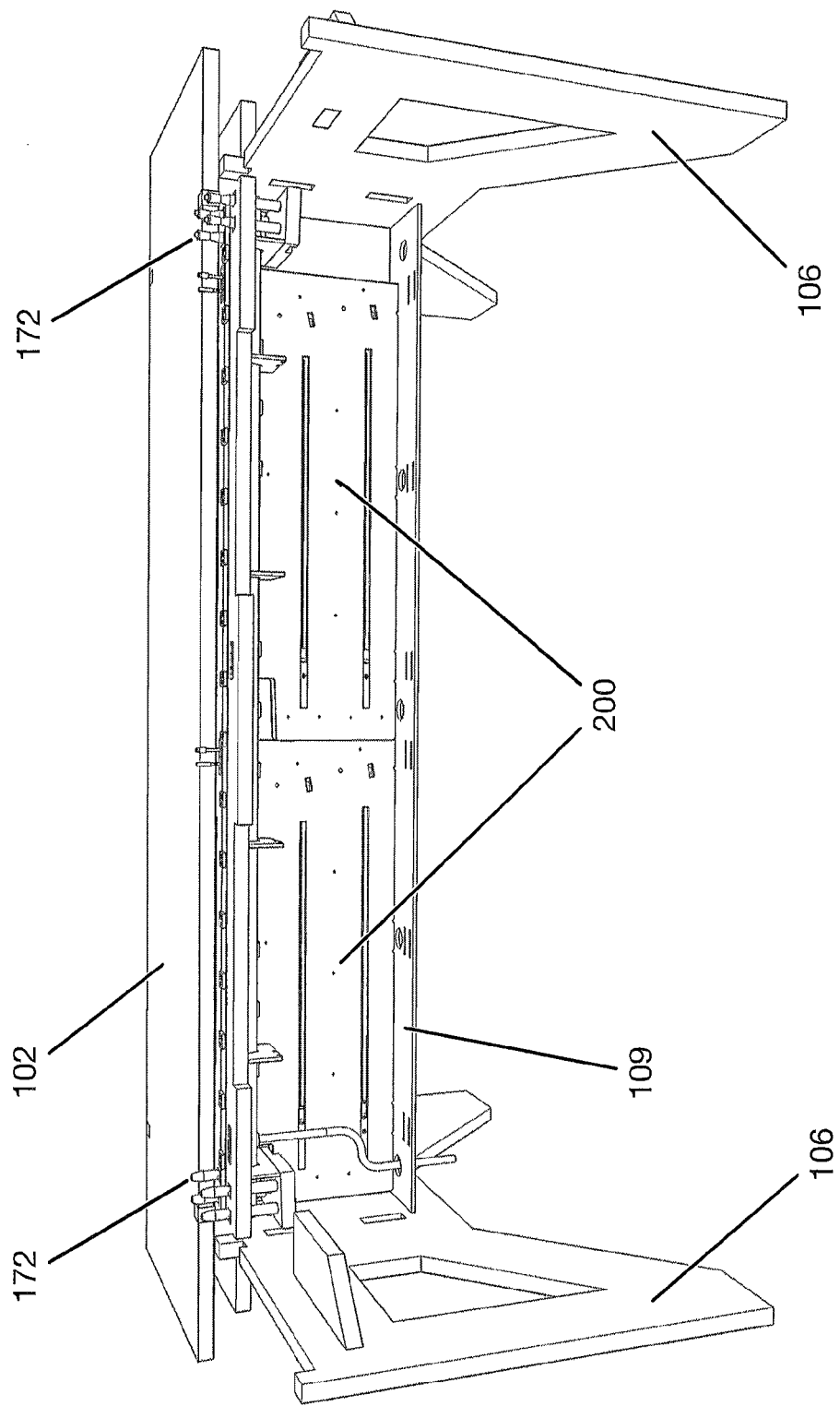
FIG. 15—Perspective view with one top panel, one stretcher panel and two cable retractors removed to further illustrate the layout and packaging of the cable retractor mechanisms. Two cable retractors are shown.
Figure 16:
FIG. 16—Perspective view of a stretcher panel with a dado groove that supports the bottom panel of the dry-erase marker pen storage wells.
Figure 17:
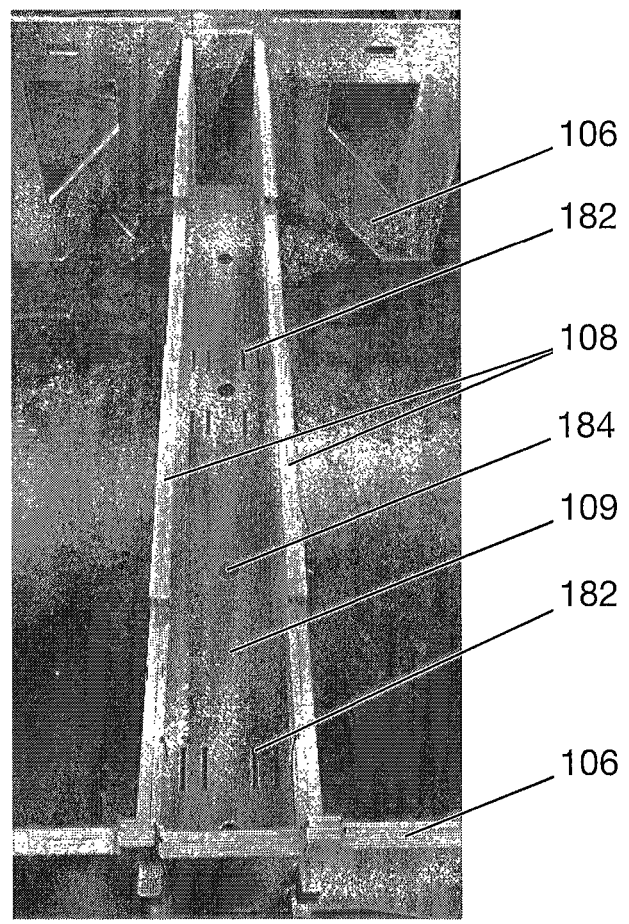
FIG. 17—Perspective view of a table frame showing the space where the cable retractor mechanisms may be installed.
Figure 18:
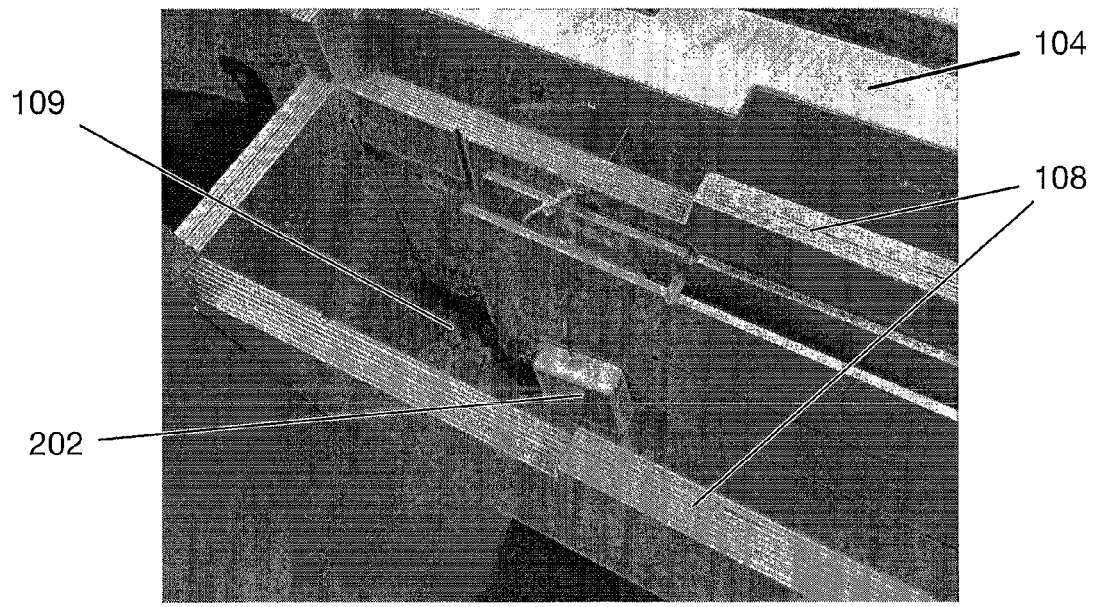
FIG. 18—Perspective view of one cable retraction mechanism placed in the center space of a table frame.
Figure 19:
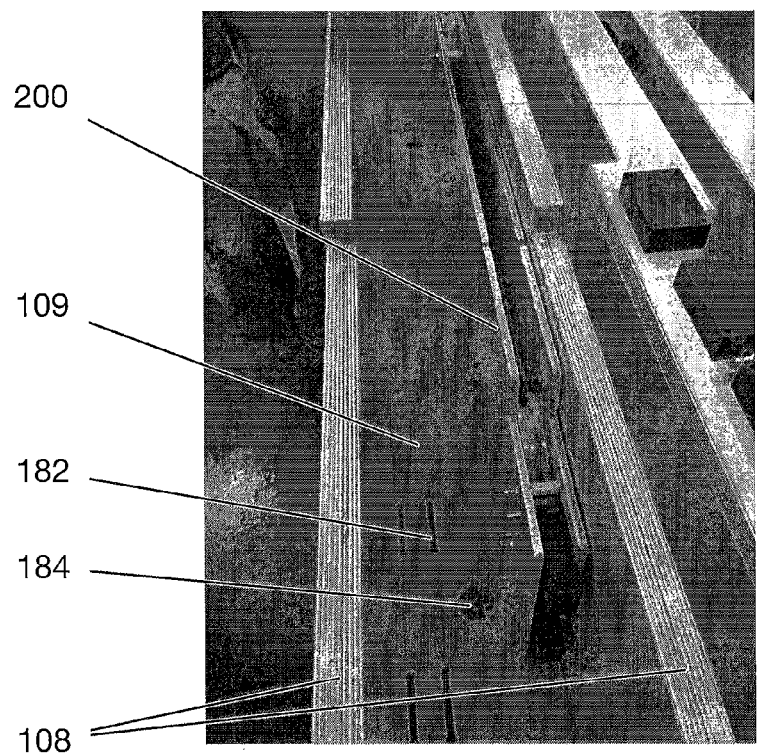
FIG. 19—Perspective view of one cable retraction mechanism placed in the center space of a table frame.
Figure 20:
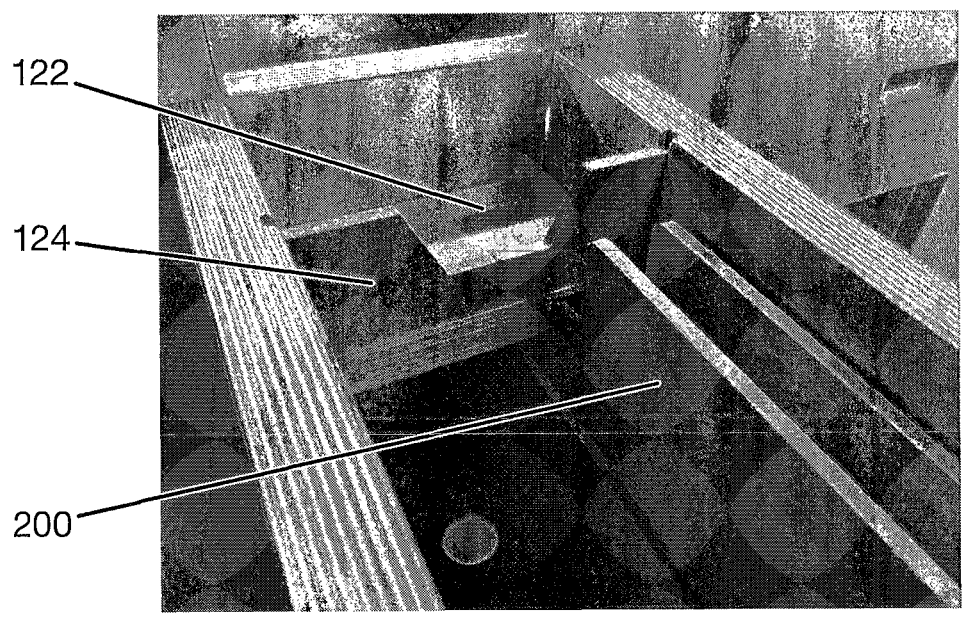
FIG. 20—Perspective view of one cable retractor mechanism installed along with a dry-erase marker pen storage bottom and side panel.
Figure 21:
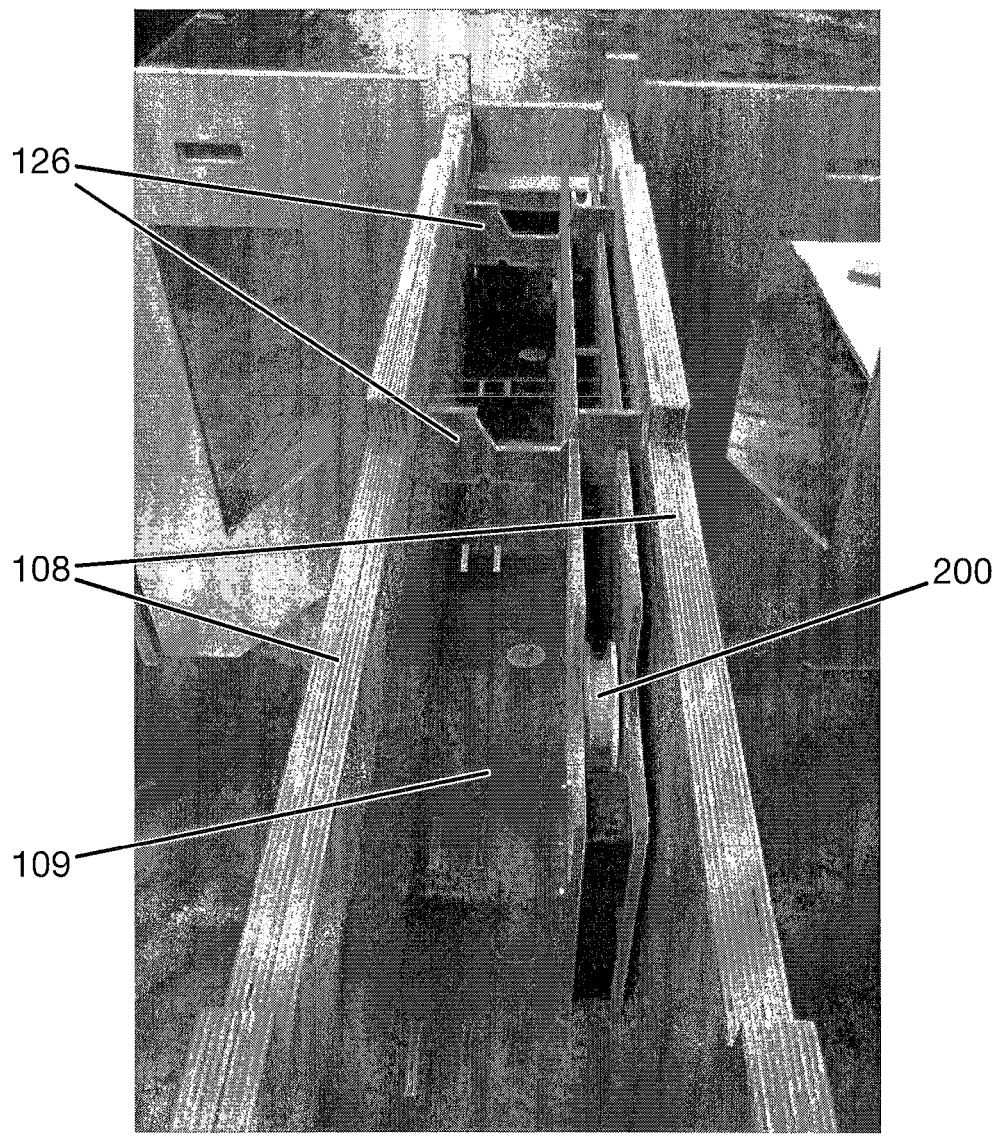
FIG. 21—Perspective view of one cable retractor mechanism installed with two locator panels and one dry-erase marker pen storage bottom.

Eighth, after the electrical connections are made between the power strip 204 in the center panel 104 and the cable retractors 200, the center panel 104 is lifted and rotated 90 degrees, then lowered onto the frame as shown in FIG. 8.

Ninth, the top panels 102 are then lowered onto the leg panels 106, completing the assembly.

Accessory Power Unit

A self-contained power accessory unit may be produced that provides the power and cable concealment functionality of the table, but without the legs and table tops so that this self-contained unit may be attached to other furniture. Two examples are shown in FIG. 51 and FIG. 52.

The frame, or housing, of the unit may be constructed in the same manner as the table frame described before, or it may be constructed in a variety of other manners to produce an enclosed channel that houses the power strip and optional power adapters. For example, two plywood side panels may be rigidly attached to a bottom plywood panel using traditional joinery techniques such as wood glue and brads to form a U-shaped channel, then the ends may be capped with two additional plywood panels to form an enclosed volume. Another example may be a channel formed from sheet metal that is bent into a U-shape, with ends that are also formed from sheet metal and attached to the channel to form an enclosed volume. Another example may be a channel formed from sheet metal that is bent into a G-shape as illustrated in FIG. 52 that incorporates a mounting mechanism suitable for clamping onto a table edge.

A unit may be attached to an existing table to provide power to existing furniture. This allows a user to choose a different table design from another manufacturer and to then add power and concealable cables to that table. The unit could be attached to a table through a variety of methods, such as vertical fasteners as shown in FIG. 51 or a clamping mechanism 206 as shown in FIG. 52.

Figure 51:
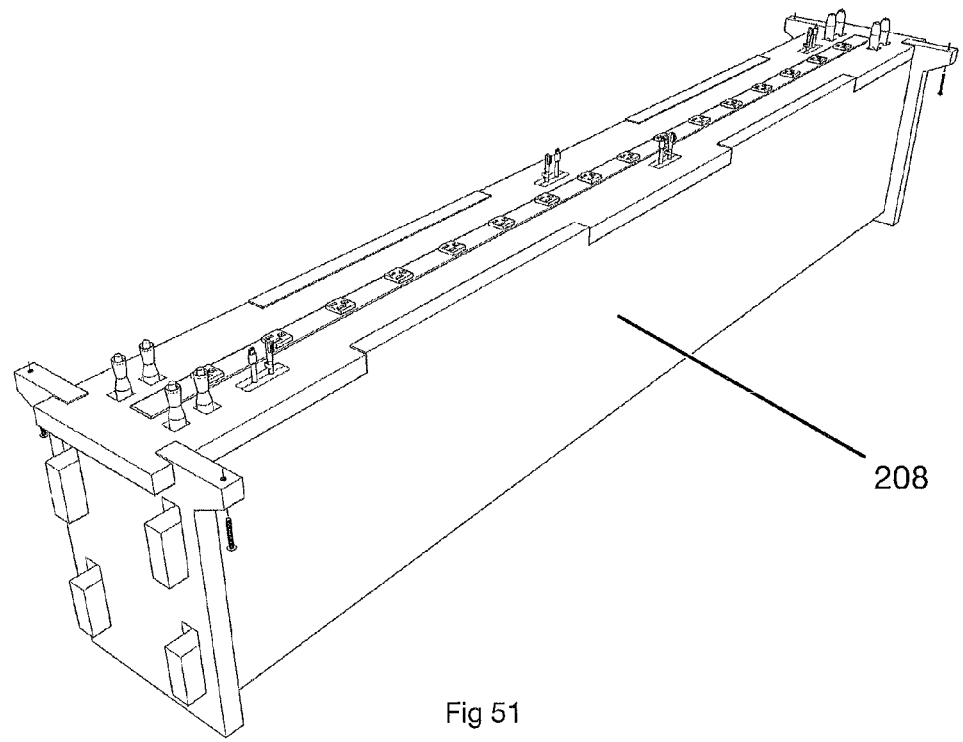
FIG. 51—Perspective view of accessory power unit, shown with screw fasteners for attaching to tables.
Figure 53:
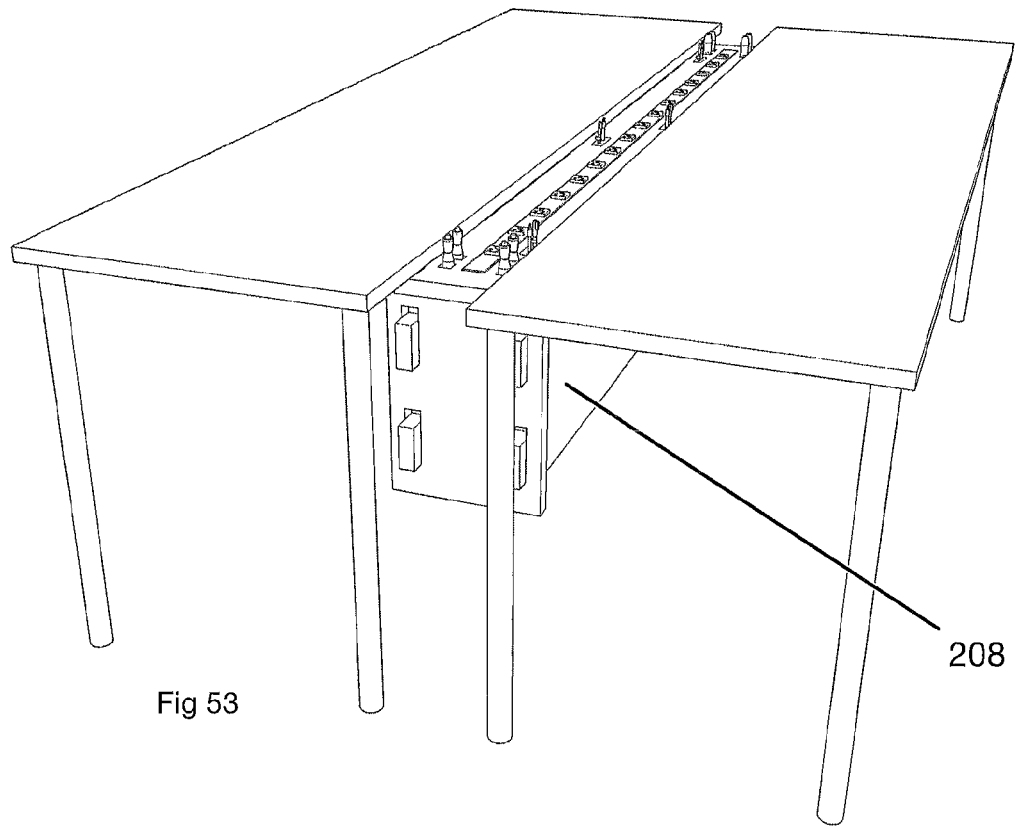
FIG. 53—Perspective view of accessory power unit attached between two tables.

The unit as shown in FIG. 51 would be raised up from underneath the table and attached to the underside using threaded fasteners. The unit may be attached to a single table or between two tables as shown in FIG. 53 to provide power to both tables.

Figure 55:
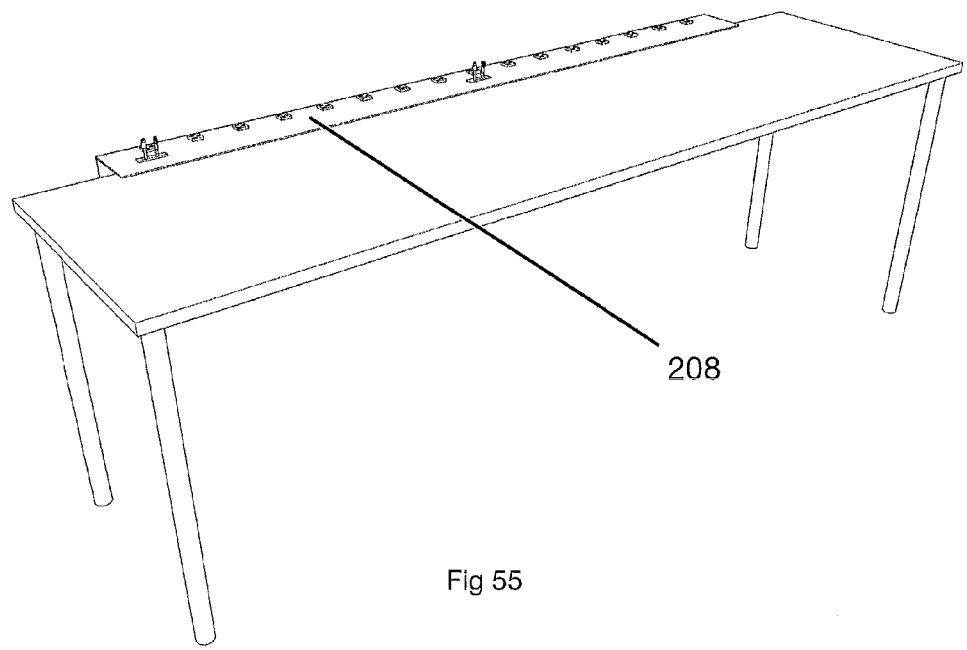
FIG. 55—Perspective view from above, showing accessory power unit clamped to a table.
Figure 56:
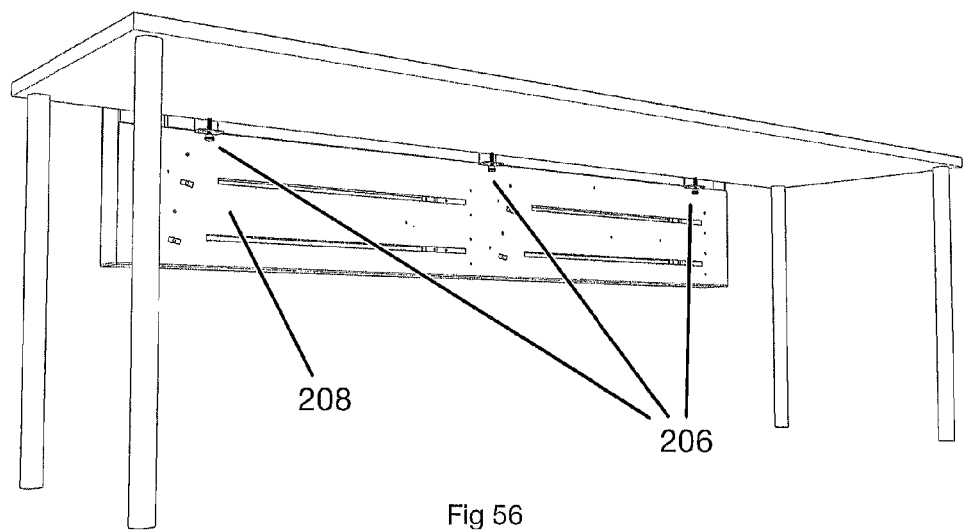
FIG. 56—Perspective view from below, showing clamp mechanisms securing the accessory power unit to a table.

The unit as shown in FIG. 52 would be clamped onto the rear edge of a table top as shown in FIG. 55 and secured using thumbscrews as shown in FIG. 56. It is possible to produce a unit that is narrower and that has concealable cables on only one side, as shown in FIG. 52, or on one or both ends of the unit. As shown, this is well suited for a table or desk that will be located against a wall that may be for a single user or for multiple users sitting side-by-side.

Figure 54:
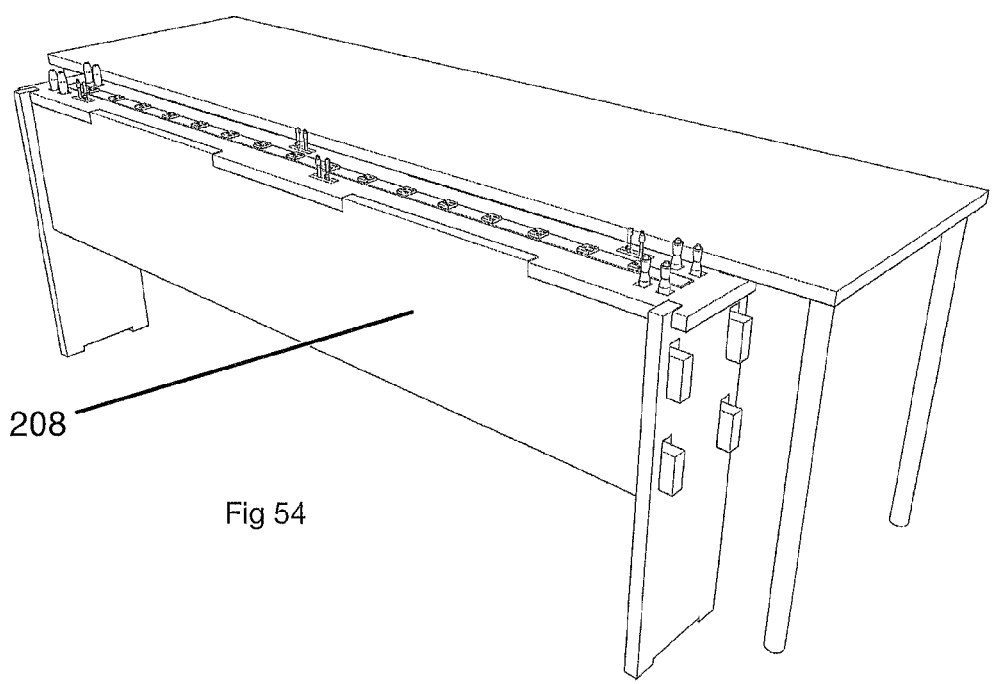
FIG. 54—Perspective view of stand-alone accessory power unit located adjacent to a table.

The unit may also be produced as a stand-alone piece that does not require another piece of furniture for attachment or support, as shown in FIG. 54. The unit may be designed with legs or have legs attached to it to allow it to stand upright by itself, much like a sofa table can be stood behind a couch without attaching the sofa table to the back of the couch. The unit may simply be moved adjacent to the table at which the functionality is desired. This provides a more flexible solution that does not require tools or hardware for installation, and does not damage or alter the adjacent piece of furniture in any way. Casters may also be attached to this stand-alone unit for ease of mobility so that it may be moved around and used in temporary situations more easily.

It will be appreciated that this embodiment includes the same cord organizing members, i.e., cable retractors, chamber dividing walls, or like members, as the embodiments described above.

I claim:

1. A table for concealing one or more power adapters, each power adapter having a power cord, the table comprising:
   a frame;
   at least one table top supported by the frame;
   a volume at least partially concealed by the table top;
   a power strip comprising: at least one first power outlet facing away from the volume; and at least one second power outlet facing towards the volume and disposed within the volume for receiving the one or more power adapters; and
   at least one cord organizing member operably associated with one or more power cords, each cord organizing member being disposed at least partially within the volume for organizing the one or more power cords;
   wherein each of the one or more power adapters is physically isolated; wherein the first power outlet and the second power outlet point in different directions.

2. The table according to claim 1, wherein the cord organizing member is a cable retractor;
   wherein the cable retractor operates parallel to a plane of the at least one table top.

3. The table according to claim 2, wherein the cable retractor is a spring biased mechanism.

4. The table according to claim 1, wherein the cord organizing member is a chamber dividing wall.

5. An accessory power unit for concealing one or more power adapters, each power adapter having a power cord, the accessory power unit comprising:
- a housing defining a volume;
- an attachment mechanism for attaching the accessory power unit to another structure; a power strip comprising:
- at least one upper power outlet disposed on the housing;
- at least one lower power outlet disposed within the volume for receiving the one or more power adapters; and
- at least one cord organizing member operably associated with one or more power cords, each cord organizing member being disposed at least partially within the volume for organizing the one or more power cords;
- wherein the upper power outlet and the lower power outlet point in different directions.

6. The table according to claim 5, wherein the cord organizing member is a cable retractor.

7. The table according to claim 6, wherein the cable retractor is a spring biased mechanism.

8. The table according to claim 5, wherein the cord organizing member is a chamber dividing wall.

9. A table for concealing one or more power adapters, each power adapter having a power cord, the table comprising:
- a frame;
- at least one table top supported by the frame;
- a plurality of volumes at least partially concealed by the at least one table top;
- a power strip comprising:
  - a first plurality of power outlets facing towards the plurality of volumes; and
  - a second plurality of power outlets facing away from the plurality of volumes;
- at least one power outlet of the first plurality of power outlets disposed within each of the plurality of volumes for receiving the one or more power adapters; and
- at least one cord organizing member operably associated with one or more power cords, each cord organizing member being disposed at least partially within the volume for organizing the one or more power cords;
- wherein each volume of the plurality of volumes is configured for retaining only one power adapter;
- wherein the first power outlets and the second power outlets point in different directions.

10. The table according to claim 9, further comprising:
- a chamber dividing wall located between adjacent volumes of the plurality of volumes.

11. The table according to claim 9, wherein each volume of the plurality of volumes is isolated from one another.

* * * * *